United States Patent [19]
Krebs

[11] Patent Number: 5,557,320
[45] Date of Patent: Sep. 17, 1996

[54] VIDEO MAIL DELIVERY SYSTEM

[76] Inventor: Mark Krebs, 54 Grandview Ave., Toronto, Ontario, Canada, M4K1J2

[21] Appl. No.: 380,997

[22] Filed: Jan. 31, 1995

[51] Int. Cl.⁶ .................................................. G06F 13/10
[52] U.S. Cl. ............................... 348/12; 348/13; 455/6.3; 364/514 A; 364/514 C; 364/514 B; 364/514 R; 395/200.01; 395/200.03
[58] Field of Search ..................... 395/200.01, 200.03, 395/200.04, 200.11; 348/6, 12, 13, 14–19; 359/400, 402, 407; 455/3.1, 4.1, 5.1, 6.3; 364/514 R, 514 A, 514 C, 514 B, 401; 379/201, 202, 203, 204, 205, 206, 207, 220; 370/100.1, 94, 62

[56] References Cited

U.S. PATENT DOCUMENTS

| | | | |
|---|---|---|---|
| 4,709,418 | 11/1987 | Fox et al. ................................. | 455/612 |
| 5,027,400 | 6/1991 | Baji et al. ................................. | 380/20 |
| 5,247,347 | 9/1993 | Litteral et al. ........................... | 358/85 |
| 5,267,334 | 11/1993 | Normille et al. ......................... | 382/56 |
| 5,278,889 | 1/1994 | Papanicolaou et al. .................. | 379/53 |
| 5,303,296 | 4/1994 | Zucker ...................................... | 379/67 |
| 5,491,797 | 2/1996 | Thompson et al. ................. | 395/200.03 |

FOREIGN PATENT DOCUMENTS

| | | | |
|---|---|---|---|
| 93102843.5 | 2/1993 | European Pat. Off. ....... | H04N 7/137 |

OTHER PUBLICATIONS

Flanag, William A., Frames, Packets and Cells, pp. 103–173.
Morse, Stephen, Super E–Mail, Network Computing, Oct. 15, 1994 pp. 30–34.
Heijnemans, et al., Implementation of TV . . ., ECOC, 1990, pp. 687–692.
Kojima et al., Visual Communication . . ., IEEE THAM 19.7, pp. 362–363.
Chang et al., Call Processing . . ., pp. 225–229.
The Packet, Cisco Systems Users Magazine, Winter 93, pp. 1, 14–17.
Video Dial Tone: Putting the Pieces Together, Telephony Jul. 25, 1994 pp. 6–21.
Digicipher II Multi–Channel Digital Television System Video Compression Chipset . . ., Fast Forward with LSI Logic, Dec. 1990 pp. 1–3.
Video Communications Using 36150 ATMNET, Newbridge 1993 Proposal for AT&T Interspan ATM and Global Frame Relay Services . . ., AT&T, Dec. 13, 1993.

*Primary Examiner*—Victor Kostak
*Assistant Examiner*—Nathan J. Flynn

[57] ABSTRACT

A sender-subscriber based, transmission traffic control system for video mail, which includes the transmission of bulk electronic data primarily in the form of still or motion picture images, with or without audio track. There are variable bandwidth controls on a per transmission basis. A delivery network system provider often a subscriber service in which the network has absolute control over the actual time of the video mail transmission. The path, bandwidth allocation, protocol format, and other means of transmission—such as wireless, satellite, analog—can be set at the discretion of the network provider. The system can provide transmission data, such as delivery and receipt notification to each sender-subscriber, each recipient, and all other participating transmission agents and networks that are different from the managing network delivery system.

6 Claims, 8 Drawing Sheets

FIGURE 2
Transmission time : 7:05PM
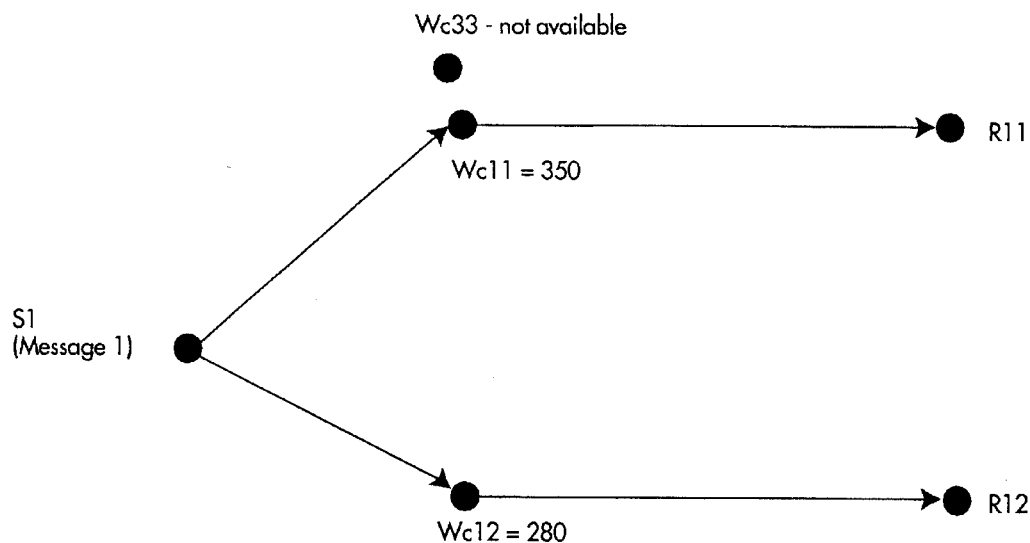
Transmission time : 7:05PM
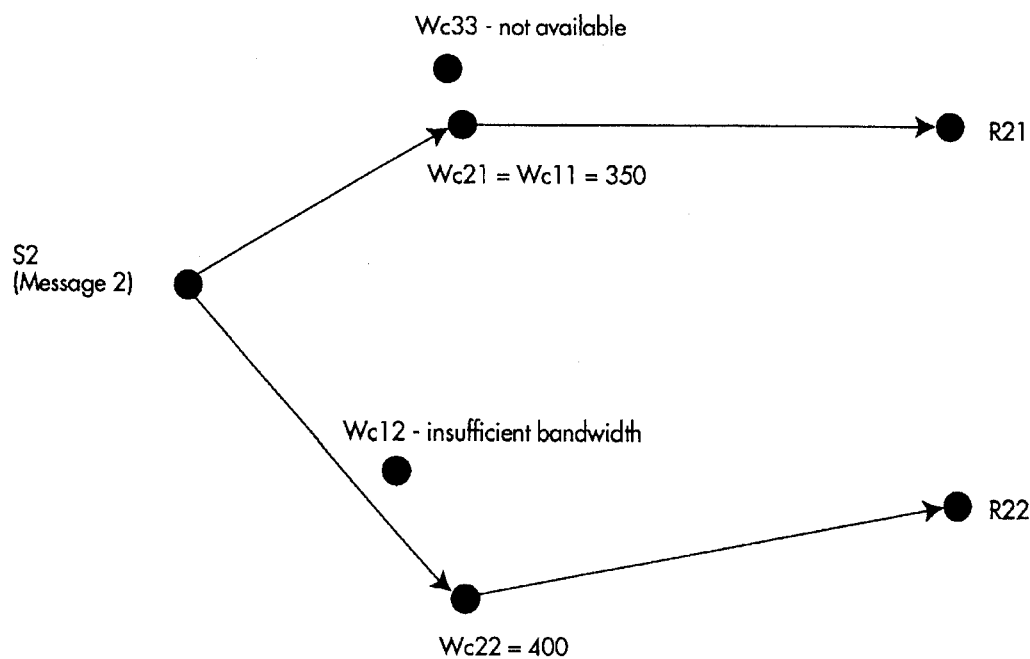

Video Mailbox Database

| Sender network node address | Receiver(s) network node addresses | Transmission time(s) | Duration (Size) | Encryption request (y/n) | Certification Name/Address | Virtual Path Controls per Receiver Path |
|---|---|---|---|---|---|---|
| 416-555-2222 | 212-333-4444 | 7:00PM/ 01/01/95 | 3 min. x 1.2 MB/sec = 216 MB | Y | — | |
| | 212-888-9999 | 6:00AM/ 02/01/95 | | — | — | |

FIGURE 8

Virtual Path Controls per Receiver Path

| Narrowband Network Control Point Node Address | Bandwidth Window(s)/Time | Switch/Router Protocol Interfaces | Compression Method | Modulation Method | Encryption Method | Bandwidth Throttling/ Scale | Analog/ Digital Conversion Interface | Satellite Acceptance Band | Wireless Acceptance Band |
|---|---|---|---|---|---|---|---|---|---|
| 416-333-2222 | 7:00PM/ 900 MB 9:00PM/ 600 MB | ATM FDDI OC3c | MPEG | VSB | Public Key | 200 -> 1.5 MB | RF Analog | 400 -> 600 Mhz | 50 -> 150 Mhz |
| 212-333-6666 | 7:00PM/ 500 MB 9:00PM/ 400 MB | SMDS ATM | — | — | — | — | — | — | — |

47

VIDEO MAIL DELIVERY SYSTEM

FIELD OF INVENTION

The invention relates to telephone, wireless, satellite and CATV communication systems and networks. In particular the invention relates to the delivery of video content.

BACKGROUND OF THE INVENTION

The current methods of delivering video data over existing television, telephone and computer networks require either fixed transmission methods or possible lower transmission quality.

The transmission of images and full motion video data over television networks has evolved from (i) broadcast television transmitting fixed schedules of programming, (ii) to multiple channel cable television, available to local CATV subscribers, (iii) to pay-per-view programming, where subscribers place an order with the cable operator for the subscriber's descrambling of a scheduled program to permit subscriber viewing at a designated time.

Due to the emergence of more sophisticated, standardized digital compression techniques like Motion Pictures Experts Group (MPEG), and switched, scalable protocols like Asynchronous Transport Mode (ATM), more video data in a compressed, switchable form can be transmitted along virtual channels through the existing telephone line, cable or satellite transponder communications infrastructure. Video signals typically take up about 140 Mb/s of bandwidth. Initial source encoding and compression can reduce this to 45 Mb/s. MPEG compression techniques can now reduce these signals to 1.5 Mb/s for VCR video to 12 Mb/s for realtime, sports network quality. Most CATV systems deliver 450 MHz or 550 MHz to the household at 6 MHz per television channel, with rebuilds delivering 750 MHz. The upper 5–45 MHz can be used for emerging digital delivery, where a 1.2 Mb/s video signal compression can transform a single 6 MHz channel into supporting 12–14 VCR quality channels. The penetration rate of these reception capabilities, however, will take several years to implement, and until that time, other intermediate, interactive video reception strategies like the following patent examples, have been proposed.

Literal et al. U.S. Pat. No. 5,247,347 describes a PSTN architecture for video-on-demand systems, as well as subscriber control of video programming delivery. Accordingly, subscribers are provided with an interface unit including a local loop node for receiving a multiplexed signal from a subscriber local loop. The Central Office interface to the subscriber can receive video signals from a video information provider, and telephone voice and data from the subscriber, the latter allow the subscriber to digitally interact with a Video Information Provider (VIP) system, to enable it to receive buffered digital video signals from a remote Central Office video database through a Digital Cross-Connect (DCS) provided by the PSTN. This digital interaction provides for the selection of a wide variety of selected compressed video/audio data programs, including feature films, music videos, medical and commercial imaging, video phone, video conferencing and video games. Various combinations of voice and data interaction of the subscriber with the VIP are possible, but in all cases video control data is provided over the subscriber loop, which may be coaxial cable, optical fibre or telephone lines from the subscriber's premises to the video buffer in the VIP system, which controls the receipt of video signals.

The subscriber's local loop for the receipt of the compressed video signal must support a 1.5 MB/s digital transmission, or be comprised of a D1 channel (normally a 24 telephone line bundle) overlaid with the standard telephone service signaling.

An alternative to centralized television or cable video distribution systems are video telephony systems, where multiple system users generate their own video transmissions. These PSTN systems are often bandwidth limited, providing only still frame or limited motion video conferencing capabilities, though recently, digital telephone access lines, such as ISDN, can provide scalable better quality. Digital access facilities to consumer homes, however, are not readily available because they require expensive bandwidth commitments through multiple lines or fibre optic links to the nearest telephone company ISDN switch.

In Papanicolaou et al. U.S. Pat. No. 5,278,889, a video telephony system is proposed using cable-television-telephony and a special method of video telephony dialing to overcome some issues of household video telephone cost. Digital bandwidth access limitations for full motion video to the household are viewed as a significant limitation, and these will not be overcome until all homes are provided with fibre access. Hence, a system involving a coaxial cable network, preferably part of an existing cable television system, is proposed to provide a local access link for the transmission of video telephone signals between each originating and destination location and a respective "head end" located on the cable company premises. Each of the head ends is connected to a Point of Presence (POP) of a telephone common carrier, such as AT&T, so that a connection between pairs of head ends, and thus between a pair of video telephone locations, can be made via a switched network maintained by the carrier.

Hence, the cable subscriber can "borrow" part of the RF cable bandwidth not used for entertainment channels and use it for video telephony. A demodulated audio and video signal from a consumer-type camera or camcorder at the subscriber's home is converted to a compressed digital signal, multiplexed with other digital signals on the trunk line and sent to carrier's local POP as a 384 Kb/s composite signal using an ISDN Primary Rate Interface (PRI) connection. Thus, a video telephone number, which could be the same as the subscriber's standard 10-digit telephone number that uses a video capable extension, provides the subscriber with a video telephony dial-up connection through the network.

In the Papanicolaou et al. system, calls are always initiated and completed by the subscriber, with a Network Control Point (NCP) database containing coaxial cable connection path information along with the ISDN bandwidth subscription of the subscriber to provide an automatic telephone call link to a subscriber with similar carrier/cable head end or straight ISDN connectivity to another local exchange. Transmission rate information in the NCP database is also used for rate revision as a video call is being made, if it is discovered that destination subscriber's equipment can only support a lower rate. Hence, the caller's local POP is instructed by the system to re-initiate the call at the lower rate.

As mentioned before, bandwidth capabilities and the network infrastructure required to support the bandwidth necessary for digital video communication can define the quality of the video image. The 384 Kb/s composite signal rate described in the Papanicolaou et al. system is not television quality and not video quality, which at present, given the best MPEG2 compression capabilities, still requires at least 1.5 Mb/s of bandwidth.

In Baji et al. U.S. Pat. No. 5,027,400, a bidirectional, interactive multimedia system is discussed as a combination of cable and a broadband ATM network, the purpose of which is to deliver television commercials requested by subscribers over a cable television network. The desired program and advertisement are delivered to the subscriber via an ATM exchange, and a subscriber video buffering and mixing system encodes the retrieved video or still image information into the cable television channel feed of the subscriber's choice. The system is essentially an on-demand video/image clip database management system, using cable channels for direct to household transmission.

Existing video-on-demand systems are notionally an approximation of a per transmission based delivery system, but their transmission capabilities are defined by the notion of one sender and multiple subscribers retrieving video information from a central office video database. The network controls do not require the degree of traffic scheduling and bandwidth control per transmission that would be necessary for varying numbers of senders and receivers at varying locations, sending varying durations of video data.

Normally, corporate clients lease permanent transmission bandwidth from a PSTN or private network, which is defined by leased bandwidth access. The scale of this access is defined by total corporate needs and is not expressed on a per transmission basis. It requires either a dedicated broadband, point-to-point channel to each destination, or a broadband access line connection to the nearest PSTN POP that handles Switched Multimegabit Digital Services (SMDS). Needless to say, the leasing charge for such dedicated channels or broadband access is beyond what any individual consumer could afford. However, the maintenance of this access allows corporate clients to transmit bulk data at their discretion.

A consumer-scoped video messaging system today could assume the form of a video telephony system as discussed in the prior art. However, the continual maintenance traffic and bandwidth capabilities related to the requirements of on-demand, bidirectional user control, presupposes constant parameters that imply bandwidth and broadcast restrictions. Bandwidth is a subscription bandwidth, and uniform throughout the network at set subscriber rates. The subscriber cannot invoke bandwidth that is greater for some transmissions and less for others. This would present an unmanageable traffic problem. Broadcast routing, in the form of conferencing call bridging, must be limited to a few participants. This is due to the node architecture and bandwidth uniformity for all transmissions along the transmission paths of the video telephony network.

Discussions of video mail systems in conference literature on computer networks refer to as a feature of the message-based, common channel signaling protocol of multimedia desktop computer workstations. Networked parties can communicate in several ways using network-informing, call messaging type formats, video mail being one of several realtime messaging types. Video mail is also understood as a special video clip message subset of electronic mail or e-mail. It is described as possessing a new protocol structure, like MIT's Multipurpose Internet Mail Extensions (MIME) protocol, which allows computer workstation users to address and transmit video clips as a supplement to the Internet standard Simple Mail Transfer Protocol (SMTP) for e-mail.

Multimedia "mailboxes" are similar to e-mail mailboxes. They allow computer workstation users to transmit and retain video mail messages to each other, by providing a multimedia computer directory structure. They can also be used to send video mail messages from a user to a process or a process to a process, to produce a combined end result, like an animated computer graphic composite on realtime video. However, computer networks are essentially fixed transmission systems, involving fixed topologies, predetermined messaging controls and uniform bandwidth, based on a required upper limit traffic handling capability.

The object of the invention is to solve one or more of the drawbacks in existing systems discussed above, or to provide other improvements to the art.

SUMMARY OF THE INVENTION

This invention relates primarily to the field of telephone and computer networks. In a first aspect the invention provides a method of transmitting bulk data with a component in the form of still or motion picture images. The data is sent from at least one sender to at least one receiver under the control of a managing network provider. The method executes on a per transmission basis the following steps:

a) each sender identifies intended receivers to the managing network provider and the duration or size of an intended transmission of data, b) the managing network provider checks data transmission traffic over a virtual transmission path between each sender and each identified receiver to determine appropriate transmission times, c) the managing network provider provides a scheduled transmission time to each sender, d) the managing network provider sets up each control point along the virtual transmission path to each identified receiver for the scheduled transmission time, and e) each sender transmits the bulk data at the scheduled time through the virtual transmission path to each identified receiver.

In another aspect the invention provides a broadband video mail transmission, defined as a transmission of bulk electronic data with a component in the form of still or motion picture images, with or without audio track, that assumes delivery, characteristics of posted mail. The managing network provider, being a PSTN, cable company or private network, assumes all control over the transmission and network setup, in place of the sender's involvement outside of simply inputting the message, and reports the particulars of the transmission, including the transmission time/receipt time, to all other subsidiary network providers, and, if requested, in the manner of registered or certified mail, to the sender and receivers of the message.

Each video transmission request is scheduled for transmission by a managing network provider, and the video transmission itself can be manipulated during transmission by all involved telephone and/or computer networks, in a way analogous to the post office handling all aspects of letter delivery after a letter is deposited in a mailbox. This imparts a full range of transport capabilities on a per transmission basis to the managing network provider who may combine, for different sections of the transmission path, a variety of agent networks, local and interurban interexchanges, along with fibre optic and coaxial, satellite, analog RF and digital wireless communications infrastructure. The managing network provider can also transport the message through a variety of digital protocol formats, compress and decompress the message at certain points on the transmission path, and interchangeably convert between analog and digital formats, depending on the switch, transmitter and line hardware of the telecommunication path, to realize the most efficient transmission path for the video mail message.

This method of network provider control implies a bandwidth traffic and cost economy to both the network provider and the sender-subscriber, because it eliminates the need for the sender-subscriber to permanently engage a network provider for a dedicated send point to receiver point broadband channel to any or several video mail receivers. Transmission time itself, is determined by the managing network provider. The network provider can therefore schedule a transmission time period that optimizes channel traffic and available bandwidth. Hence, a constant subscriber access parameter never limits network capability. The same message may be sent to several destinations or the same destination using different routes, protocols and bandwidth controls along each sender-receiver transmission path.

This approach also allows the managing network provider to avoid the high cost of storing a whole video message, and to provide notification of guaranteed transmission/delivery and picture quality once the network route has been set and all receivers have been informed of the transmission time. The managing network provider could also use a system of intelligent network congestion controlling video mailboxes, each having some information storage capability and a routing switch or microprocessor, to maintain and deploy such information as the time, duration, destination (either end receivers or multimedia merging processes), bandwidth allocation, protocol format, virtual routing scenario, setup controls, and network requirement information on a number of video mail transmissions.

A video mail delivery system, characterized in this manner, could become a motivating application for the extension of urban and interurban broadband communications infrastructure, because of its potential commercial and consumer market appeal. Also, the current regulation of US Federal Communications Commission states that in order for PSTNs to offer authorized video dialtone services, they must offer common carriage gateways to other video transmission providers who may wish to take advantage of the PSTN's switching and interexchange capability.

The video mail delivery system here described could be a suitable service offering by PSTNs that complies with the current regulatory structure, in which case a PSTN network may pick up video mail transmissions from individual senders, multiplex them into a broadband interexchange channel and allow cable networks at the receiver end to act as agents of local distribution.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 2 is an example of two different transmissions through a network for the system of FIG. 1; FIG. 8 is a detailed illustration of a portion of the database of FIG. 7 showing virtual paths controls per receiver path.

DETAILED DESCRIPTION OF THE PREFERRED EMBODIMENT

Figure 1:
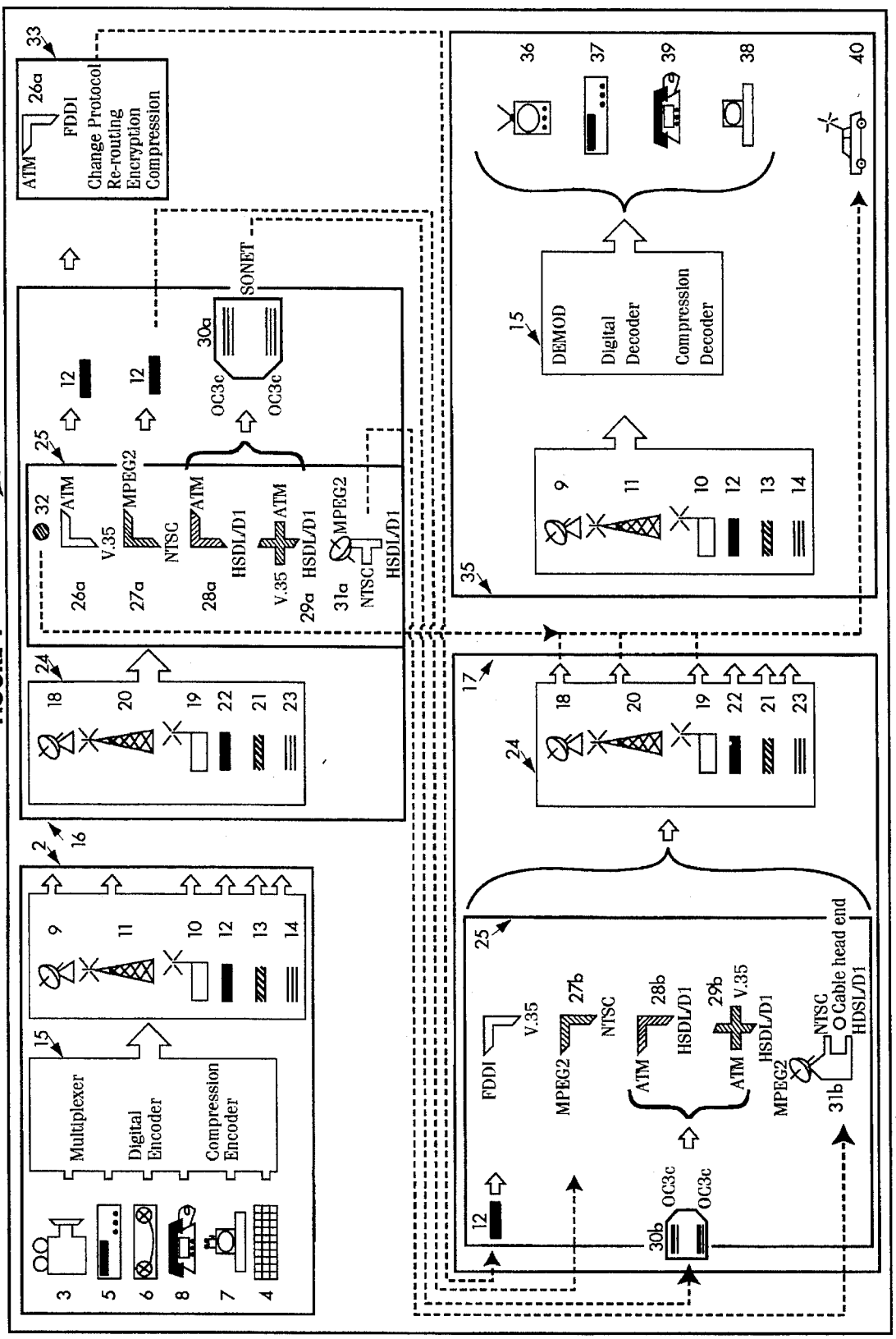
FIG. 1 is a general diagram showing telecommunication components of a video mail delivery system.

FIG. 1 illustrates example components of a telecommunication system 1 that could be used to transmit a video mail message from sender to receiver. The video mail signal initiated at the premises of the sender-subscriber 2 might be done by such equipment as a video camera 3, image digitizer or scanner 4, VCR 5, video network server 6 or video computer system 7, video telephone 8, using a satellite uplink 9, digital or analog wireless modem 10 or RF signal transmitter 11, optical fibre interface 12, bidirectionally amplified coaxial cable interface 13, or an interface to a D1 or T1 line 14 provided by a telephone company with sufficient bandwidth to transmit video of a sender-accepted picture information quality. The sender-subscriber's and receiver's equipment might also include an integrated multiplexer/demultiplexer, modulator/demodulator, digital encoder/decoder and/or compression encoder/decoder system 15.

Each network provider office, one 16 local to the sender, another 17 local to the receiver, has an analog or digital interface for either satellite 18, wireless modem 19 or RF receiver 20, coaxial 21, optical fibre 22, or D1 telephone line transmission 23. The local sender or receiver POP video signal transmission interface 24 is directly connected to a video mail gateway 25 linking into the network provider's offering of transmission paths.

The video gateway 25 is directly controlled by an operator of the managing network provider local office POP 16. The gate 25 could simply be a digital switch or router with an analog video signal interface, like a Cisco AGS+ Router 26a with an analog video V.35 interface and ATM or FDDI output, a Scientific-Atlanta MPEG2 Router using an LSI Logic L64700 CCITT Encoder 27a to take NTSC analog signal input to discrete, highly compressed MPEG2 packet output. A combination of ATM virtual channeling and SONET aggregation could be done by using an AT&T AAN-2000 High Speed Service Multiplexer 28a, or an 8×8 switch fabric, Newbridge 36150 MainStreet ATMnet switch 29a, to route ATM formatted video transmissions at Constant Bit Rate (CBR) to an AT&T interSpan's GCNS-2000 ATM System's OC3c SONET 30a channel between two major urban centers. The gateway 25 could also be represented by a General Instrument DigiCipher II 31a system to input either digital video or analog NTSC signals, multiplex and compress them as MPEG2 bitstreams, uplink them to a satellite transponder for a multiple receiver broadcast, which is then downlinked to a DigiCipher Integrated Receiver/ Decoder (IRD) 31b in a cable head end to convert back to NSTC. Finally, if the receiver were local, the gateway 25 could be a CellularVision 28-Ghz wireless transmitter 32.

Local POP video gateway switches can provide encryption, as in the case of the DigiCipher system 31a, or encryption may have to be done by routing the transmission to an interpath POP 33 PSTN Central Office that has suitable device technology. Varying picture quality, or varying bandwidth transmission, can be provided to senders like hospitals or computer graphic production studios that have special scalable bandwidth facilities themselves, like High Speed Digital Subscriber Lines (HSDLs) 15, to the network POP, or a digital video server 6 that allows transmissions at different rates.

Typical interexchange path controls would be provided at an interpath POP 33 by the PSTN. These include dedicated or switched channels using protocols such as ATM, optical fibre FDDI. SONET and Internet IP. Hence, before the i interchange transmission occurs, a control point broadband switch or router with such protocol interfaces would translate the message into one of these formats. As PSTN ATM and SONET services become more disseminated, these would be the desirable formats because of the windowing advantages bandwidth "throttling", or protocol controlled scalability and virtual channeling, and the fixed length cell based digital packets necessary for the timing of continuous video messaging. Alternatively, interexchange paths may simply favour high compression MPEG2 signal routing because of the high protocol overheads associated with ATM format. This approach is more convenient to implement in satellite communication because the entire interexchange control or even direct communication to the receivers, if they are equipped with MPEG2 decoders, can be handled by a single digital satellite uplink.

At the network provider's receiver end POP 17, video gateway counterparts 26b, 27b, 28b, 29b, 30b, 31b to the entry video gateway or an interpath POP 33, receive the incoming transmission and convert it to a suitable delivery format. The local video gateway may have to convert the signal to analog and multiplex the signal at the cable head end of a local cable network for broadcast 34, or scale signal bandwidth using multiplexers to provide different transmission windows on a frequency, multiplex basis to best suit equipment at the receiver's premises 35. The receiver then receives the transmission on a cable information channel 36, VCR 37, computer video system 38, video telephone system 39 or wireless modem. RF receiver or satellite downlink for a receiver in transit 40.

The network architecture for the example telecommunications system 1 can either be provided through a private network control system, which acts as the network manager of existing PSTN, satellite or cable network facilities, or it can be provided directly by a PSTN to the sender, where the PSTN acts as a managing network of other agent networks, if necessary, in order to provide a physical telecommunication link between a sender and a receiver.

The physical components of such a telecommunications system, including all controlling systems, which can convert a video signal from analog to digital, compress or modulate that signal using a variety of methods, encrypt the signal, uplink the signal to satellite, transmit the signal on a wireless local link, assess the traffic congestion along a given transmission path, and thereby allocate bandwidth through scheduling, all exist in today's PSTN telecommunication systems. However, these capabilities are not grouped together as controls of a common network, and a service is not offered to consumer or corporate clients, by either PSTNs or private networks as a per transmission based, video transmission delivery service.

By controlling all transmission time and routing options for each sender's transmission in the example telecommunications system 1, a managing network provider can group transmission control components represented in FIG. 1 together for each transmission path as per-transmission-flexible control parameters. Each transmission path containing these variable control parameters, defined by a managing network provider on a per transmission basis for each sender/receiver path, will be termed a virtual transmission path for the purposes of this description.

The managing network provider's virtual transmission path controls can include such capabilities as variable bandwidth allocation, variable time and band of analog RF or digital wireless transmission, strategic multiplexing, variable signal compression and modulation, and variable strategic routing and protocol format interchangeability. A selective use of satellite or wireless transmission for certain sender-receiver transmission paths can also have a strategic significance, depending on either the sender or the receiver's point of presence. If one of the parties is in transit, at least one leg of the virtual transmission path, if not the entire path, would have to be wireless. Depending on sender or receiver's transmission or reception equipment, this leg can be expressed as an analog transmission on a dedicated RF band, licensed by the managing network provider. Multiple transmissions can be scheduled sequentially on a single RF band to avoid interference.

Since transmission times and virtual transmission paths are sender-independent for all transmissions, the managing network provider has an opportunity to preempt any traffic congestion scenarios caused by multiple simultaneous or time-overlapping transmissions of continuous video mail messages along common virtual transmission paths.

Figure 3:
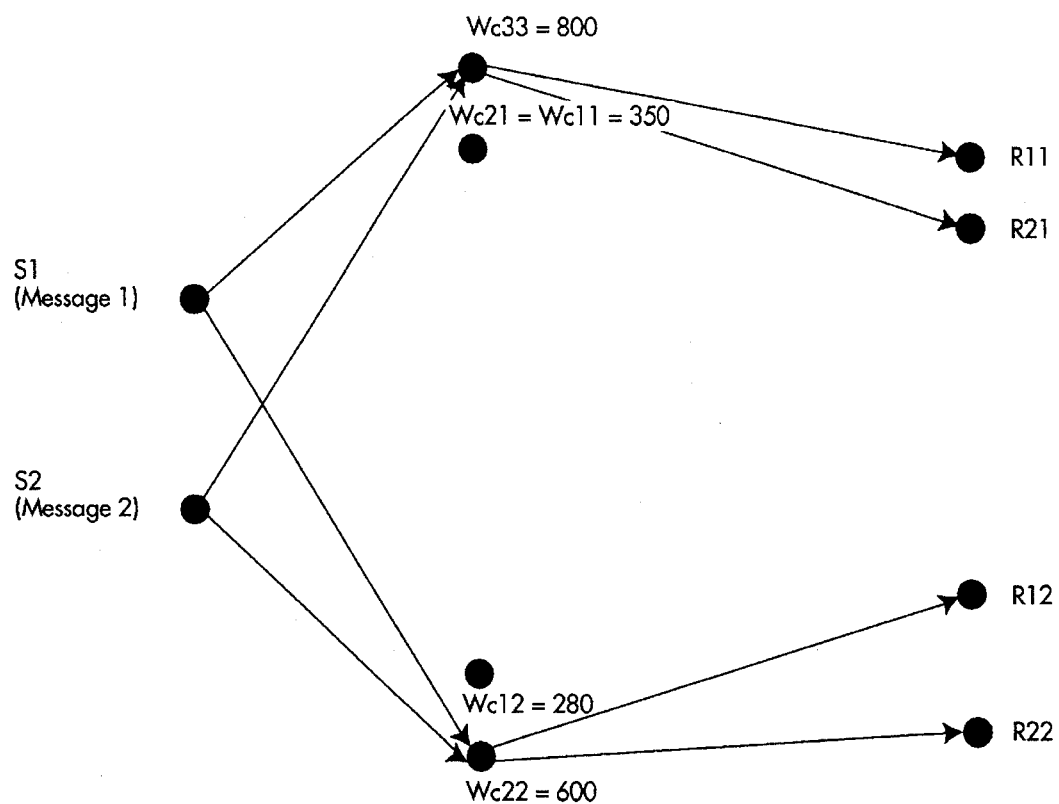
FIG. 3 is an example of two simultaneous transmissions through a network with preemptive traffic control for the system of FIG. 1.

FIG. 2 shows the bandwidth and routing requirements of two different transmissions having some common traffic control points. FIG. 3 illustrates a simultaneous transmission of the two transmissions of FIG. 2, using a per transmission based preemptive traffic control due to the managing network's assessment of an optimal transmission time and transmission paths.

Message 1 from sender S1 to receivers R11 and R12, is 3 minutes in duration. requiring a minimum picture information quality of 1.5 MB/sec., compressed rate. Message 2 from sender S2 to receivers, R21 and R22, is 5 minutes in duration, requiring a minimum picture information quality of 1.0 MB/sec., compressed rate. The minimum bandwidth window (W) for Message 1 is therefore 1.5×60×3=270 MB, and 300 MB for Message 2.

In FIGS. 2 and 3, window bandwidth, W, at example control points, c11, c12, c21 . . . , are shown at two transmission times. 7:05PM and 7:10PM. Hence, at 7:05PM and 7:10PM, Wc11 and Wc21=350 MB; at 7:05PM Wc22= 400 MB and Wc33 is not available, at 7:10PM Wc33=800 MB, Wc11 and Wc21=350 MB. Wc22=600 MB, Wc12=280 MB.

Any congestion problem arising from a simultaneous transmission of the two transmissions in FIG. 2 is overcome by scheduling both transmissions at 7:10 PM, when it is possible to use an alternative traffic routing for two of the transmission paths through another control point, c33. An additional benefit in network bandwidth is realized by economically routing the two other transmission paths through Wc22=600 MB at 7:10PM, thus freeing up bandwidth windows at Wc12 and Wc21.

Figure 4:
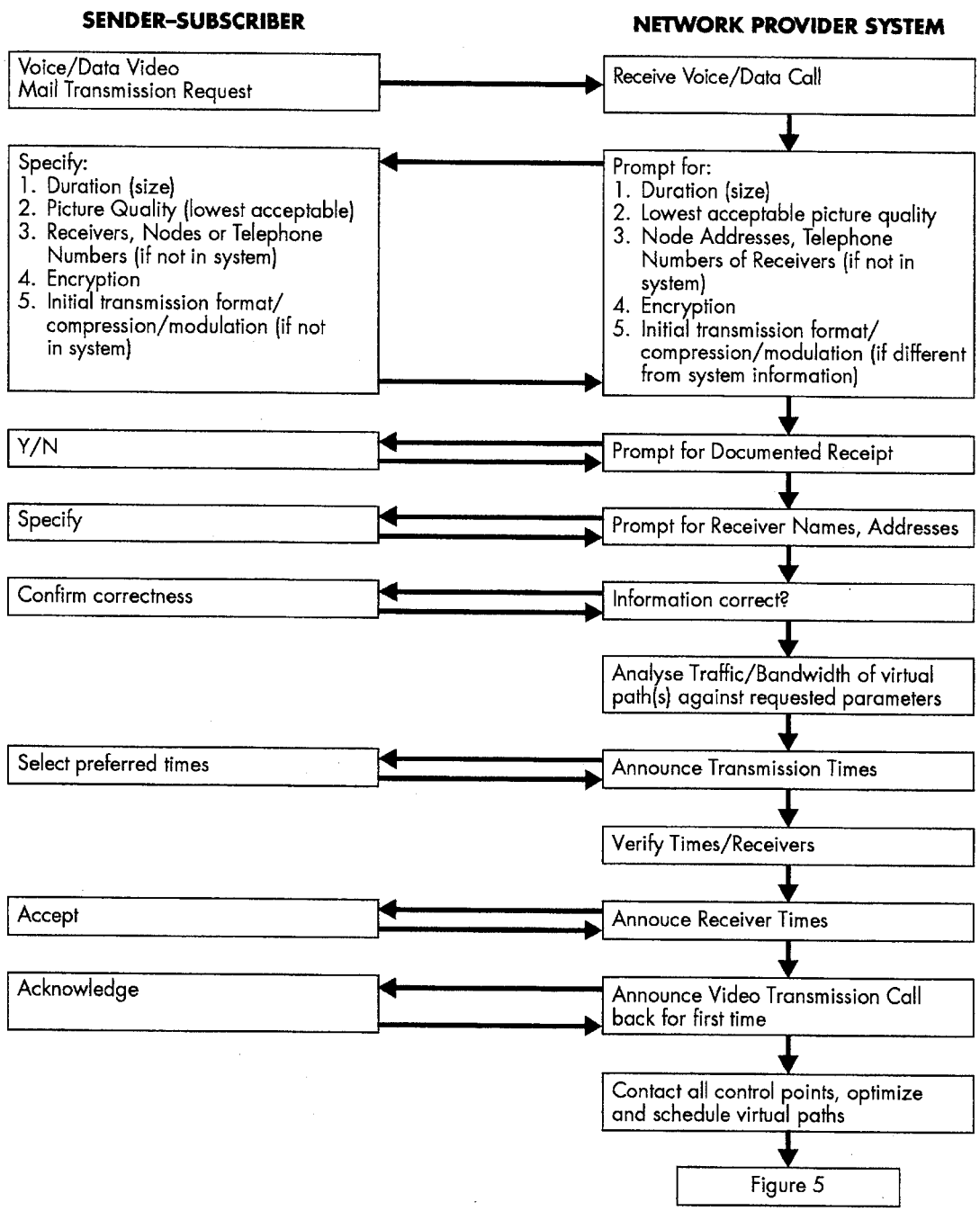
FIG. 4 and FIG. 5 are flow charts indicating sender/ managing network provider interaction steps allowing for preemptive transmission traffic control in the system of FIG. 1.

This traffic efficiency, through the preemptive 7:10 PM rescheduling and rerouting of FIG. 4, is not possible if network traffic is instigated at the senders' discretion. When senders determine the traffic picture, network controls based on network averaging or first-in-first-out (FIFO) buffering strategies accommodate new traffic flow. Hence, the network system would interrupt a second sender transmission on a common transmission path with a busy signal until the first transmission were through, but by the time the second sender attempted a transmission, there might be another interruption by a third sender's transmission along the same path.

Such network controls can deal with the problem of traffic congestion, but since they must respond, on-demand, to sender transmissions, they sometimes enforce traffic control at the expense of bandwidth efficiency. Such controls certainly do not provide predictive, efficient network usage on a per transmission basis, since transmission time, route and the amount of data of individual transmissions are not known to the network system until a sender tries to transmit. The routing and bandwidth inefficiencies of on-demand network traffic management are especially pronounced for the bulk data transmission of digital video, which require large amounts of bandwidth, fixed length packets or cells and constant, committed channel bit rate for the duration of each transmission.

The FIG. 4 drawing illustrates the steps of sender/managing network provider interaction that allows for preemptive traffic control. This interaction is initiated by the sender-subscriber through a telephone, video telephone or computer e-mail in a call to the video mail delivery. system's business office or POP 16. The number called could have a dedicated telephone prefix, like an 800 number, in which case, the office may not be local and may be some central office of the managing network provider. At the business office, the sender-subscriber either speaks to an operator or is connected to a computerized voice/data interactive system (PBX), or in the case of e-mail, a data interactive system, to allow both voice and data replies to the prompts of the interactive system. The operator or interactive system has direct access to the managing network's traffic management database, which stores information on previously scheduled traffic, qualified by network information from the managing network provider's network control system. The network provider's control system consists of automatic and network-operator assisted bandwidth and message format controls along specified transmission paths. Together, the network control and traffic information determine optimal periods of future bandwidth availability, for new virtual transmission path scheduling. These periods can be depicted as transmission time options by the operator to the sender-subscriber.

Through the steps of the interactive process described by FIG. 4, the sender-subscriber specifies the receivers and transmission duration or size, input rate, format and/or compression if this is not already included in the client database of the network provider, desired encryption, and lowest acceptable picture quality, or required picture quality/format if the sender's transmission equipment permits high resolution or differentiated data transmission rates or formats. The office operator or system may then prompt for any reporting requirements to the sender-subscriber on the actual receipt of the video mail by the receiver or receivers. If requested, the office system can provide a documented notice of video mail receipt for legal or other business purposes, and would prompt the sender for such information as the telephone number and address, as well as names, to obtain this confirmation by mail or e-mail from the receivers.

Given these sender-subscriber inputs and the existing knowledge of previously scheduled traffic, the office operator then proposes a number of alternative times for the actual transmission, given the understanding that the transmission time is also contingent on the availability of all receivers.

Receiver availability for the specified times is then verified by a network operator. This verification can be done during this initial interaction and may assume the form of a telephone call. Operator receiver verification, may not be possible or necessary, as in the case of a video mail transmission distributed through a satellite broadcast. If receiver acknowledgement is not possible during this interaction, the sender-subscriber would have to be notified at a later time by the system, as to the most suitable transmission time for receivers. If receiver availability cannot be confirmed, the office may request the sender-subscriber to stipulate another transmission time option to handle the transmission request, and the receiver verification steps would have to be repeated. Once all receivers and the sender agree on a common transmission time, this information, along with all other sender inputs, input to the managing network provider's traffic management database by the office operator or interactive system.

Prior to the actual sender-scheduled transmission linkup, all virtual transmission path controls are properly set by the managing network provider to ensure the transmission requirements. These determinations and virtual transmission path setups for all controls are pre-scheduled by the managing network provider operator. The managing network provider, being in control of the transmission time and the network traffic, is capable of requesting and scheduling bandwidth and protocol translation processing at virtual path control points from all involved network or transmission agents per video mail transmission, per receiver path for the period of each transmission.

Hence, the managing network provider can combine, at different points of the transmission path, a variety of agent networks—for example, local and interurban interexchanges, fibre optic and coaxial, satellite, analog RF and digital wireless transmission infrastructure; to translate the message into a variety of digital protocol formats (eg. ATM, FDDI, IP, SMDS, ISDN, SONET, Fast Packet); to encrypt, compress and decompress, or modulate and demodulate the message, (eg. using MPEG compression standards, Motion Compensation Prediction or Motion Compensation Interpolation, or other proprietary techniques, or digital modulation techniques, such as Quadrature Amplitude Modulation or Vestigial Side Band); and to convert from analog to digital and digital to analog formats, depending on the switch, transmitter and line hardware along the transmission path, in order to set up a viable virtual path for the video mail transmission.

Figure 5:
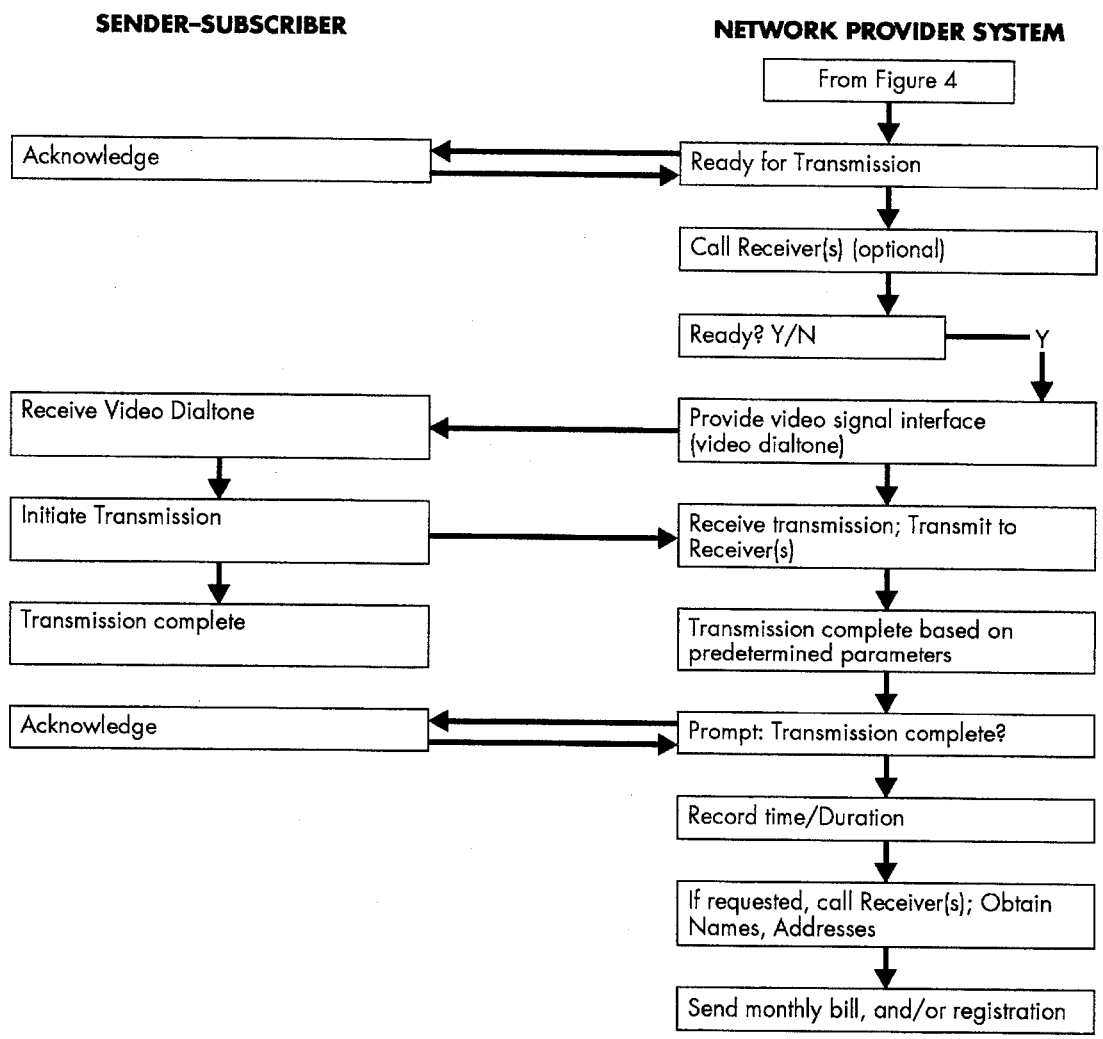

Referring now to FIG. 5, the sender-subscriber is contacted by the network system office to initiate the actual video mail transmission. Before this contact is made, the system office would have already set or scheduled the setup of all parameters along the virtual transmission paths necessary for the video mail transmission. It is also assumed that all recipient parties would also have been notified of the expected transmission time. Subsequently, the sender receives video dialtone or a connect video signal, and initiates the transmission. Once the transmission is completed, a voice or e-mail message from the business office might inform the sender of a recorded time of each receiver's reception, and documented confirmation of reception, if requested, can be mailed to the sender along with a monthly bill.

FIG. 4 and FIG. 5 and the foregoing descriptions of these two illustrations, represent the sender/system interaction of the method without showing various checks which could be used to confirm or correct each step. For example, sender-subscriber's telephone number could be cross-referenced on the database of the office system, as well as the number, address and video mail reception capabilities of the intended recipients. If the recipients weren't subscribers themselves, their technical reception capabilities would also have to be obtained through a network operator contact before being input into the traffic management database to determine the viability of network connectivity.

Figure 6:
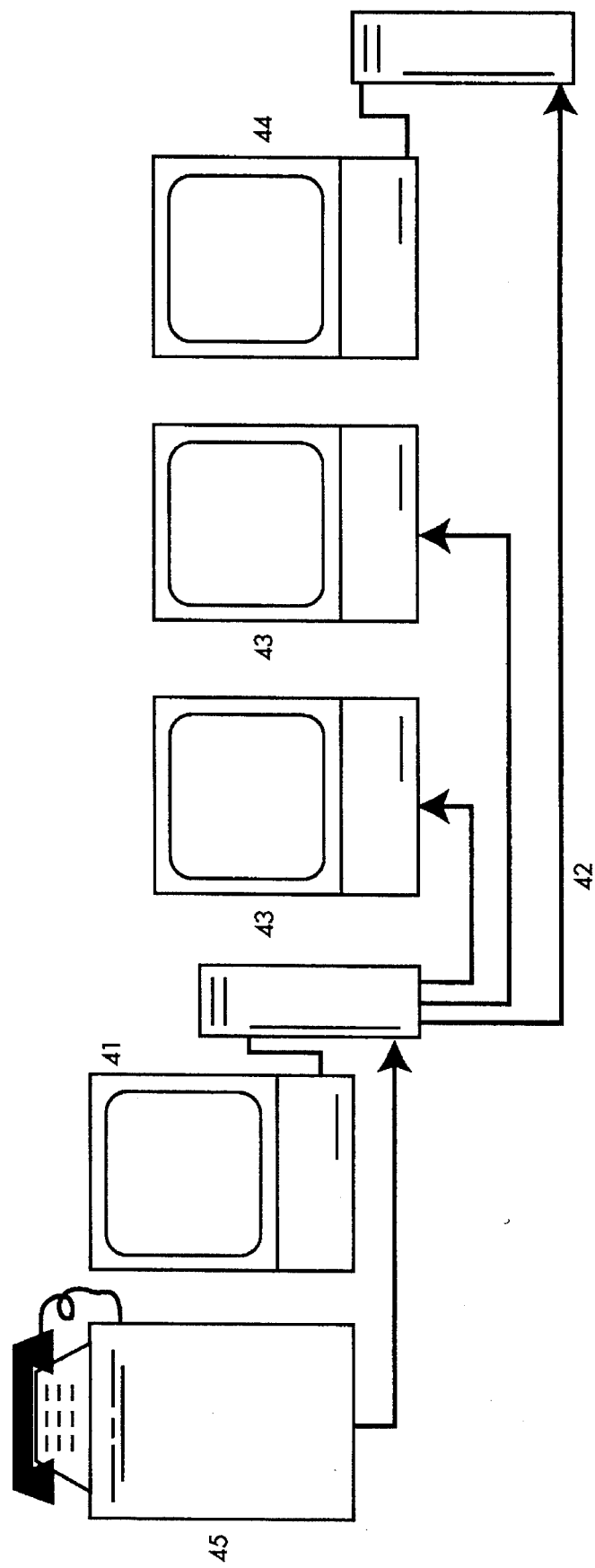
FIG. 6 is an illustration of data communication connections to a video mailbox system of control node operation and other video mailboxes.

An operator independent determination of the virtual transmission path can be done by a video mailbox system shown in FIG. 6. Video mailbox systems can automate virtual transmission path creation and provide video mail traffic scheduling control. In order to do this, each video mailbox system involves a computer system 41, connected to a narrowband network 42 for data communication updates to regional or local transmission control point operator computers 43 or actual device controllers along a video mail transmission path, and additional narrowband data communication updates to the traffic databases of other video mailbox systems 44 relevant to the administration of newly scheduled virtual transmission paths. A local video mailbox could also be narrowband networked to the voice/data PBX computer, or e-mail sender interactive office system (office operator's computer) 45, which functions according to the steps described in FIGS. 4 and 5. Sender specified data inputs transmitted directly to the local video mailbox, could then be directly input to a video mailbox database to determine transmission path scheduling and setups.

Figure 7:
FIG. 7 is an illustration of a sample transmission path database maintained in the video mailbox system of FIG. 6.

As shown by the example in FIG. 7, each video mailbox traffic database references network node addresses such as videophone numbers, telephone numbers or transmission frequencies for each sender-subscriber. Similar addresses for non-subscriber recipients would be input to the video mailbox for each video mail message, along with other per transmission inputs, such as transmission duration, input picture quality/format, requested encryption and the names and addresses of receivers for a documented reporting of video mail receipt.

The video mailbox then references database information on already scheduled traffic over the next, for example 48 hours, to determine a transmission period for the duration and picture information quality of the transmission. The video mailbox system, then calculates the transmission times based on data it already has about potential receiver path control points and bandwidth usage in its traffic database.

Additional example traffic database information, referred to as virtual path controls per receiver path 46 in FIG. 7 and shown as FIG. 8, includes information on all available routing and bandwidth control points for a given receiver transmission path. This information allows the video mailbox system t to define the routing options of the virtual path, with the available bandwidth window defined at each control point at system selected times 47. The video mailbox database also includes each control point network address 48, and can also include other control point information available for transmission control, such as switch/router protocol translators, compression/decompression and modulation/demodulation processors, agent network bridges, encryption processors, bandwidth scaling processors, analog to digital conversion processors, available satellite uplink/downlink bands and available wireless transmitter/receiver bands.

The video mailbox determines the virtual transmission path from its database of switch, router or transmitter data, and data on compression capabilities at control points along each receiver path. Efficiencies are obtained by reducing the number of agent networks or actual transmission connections, such as switches, routers, uplinks/downlinks and wireless transmitters, along a potential virtual transmission path. All efficiency criteria would be contingent on the physical switch, router and transmitter infrastructure along a required transmission path. Controls offering compression or modulation capabilities and conversion to the most ubiquitous rotating protocol would then be key priorities.

Once all optimizations are met, the virtual transmission path is defined in terms of optional times. Choosing the actual transmission time option would then follow through a common agreement by the sender, receivers and all necessary transmission path control point operators.

The foregoing is intended, along with the drawings, to illustrate the preferred embodiment of the invention. Those skilled in the art will be able to devise numerous arrangements which, although not explicitly shown or described herein, embody the principles of the invention and are within their spirit and scope as defined by the following claims.

What is claimed is:

1. A method of transmitting bulk data with a component in the form of still or motion picture images from at least one sender to at least one receiver under the control of a managing network provider, the method comprising executing on a per transmission basis the following steps:

a) each sender identifying intended receivers to the managing network provider and the duration or size of an intended transmission of data, b) the managing network provider checks data transmission traffic over a virtual transmission path between each sender and each identified receiver to determine appropriate transmission times, c) the managing network provider provides a scheduled transmission time to each sender, d) the managing network provider sets up each control point along the virtual transmission path to each identified receiver for the scheduled transmission time, and e) each sender transmits the bulk data at the scheduled time through the virtual transmission path to each identified receiver.

2. A method of video mail transmission, defined as a transmission of bulk electronic data with a component in the form of still or motion picture images, with or without audio track, the method comprising the following steps being executed on a per transmission basis between each sender and a managing network provider, being a PSTN, cable company or private network that assumes all control over the transmission and network setup, with each sender's involvement reduced to simply inputting the video mail transmission at a network designated time:

(a) each sender initiating the method by first calling the office of the managing network provider, and specifying the telephone numbers or network node address of each receiver of the intended video mail transmission and the duration or size of the intended transmission;

(b) each sender also specifying minimum picture quality and desired encryption of the intended transmission, and whether the receipt of the transmission should be registered or reported by each recipient;

(c) the managing network provider then checking existing and scheduled video mail transmission traffic between each sender and each identified recipient, to determine appropriate transmission times, taking into account all possible bandwidth and transmission controls known to the network that can provide a transmission capability to fully transmit the video mail transmission, and would also optimize available network bandwidth and transmission capabilities for other potential video mail traffic;

(d) the managing network provider announcing one or several optional transmission times to each sender;

(e) the managing network informing all potential agent networks, and all transmission control points along the transmission paths between each sender and each identified recipient of the agreed to time and data communication requirements of the intended video mail transmission, and hence, setting all control points, either through its own operators or the operators of agent networks, and informing all such agents of the pending transmission immediately before calling each sender to instruct each sender to initiate the transmission;

(f) the managing network calling each sender, each sender initiating the video mail transmission at a transmission time designated by the managing network, and then transmitting the video mail to each receiver designated by each sender;

(g) the managing network, if requested to do so by each sender, obtaining a documented confirmation of receipt of the entire video mail transmission from each receiver designated by each sender.

3. The method of claim 2, further comprising a method of transmission-time-flexible video mail delivery along a virtual transmission path, herein defined as a set of transmission controls along a transmission path from each sender to each identified receiver of the video signal transmission, wherein the transmission time, transmission speed, route, encryption, compression, modulation, protocol format, transmission devices and route, RF frequency band, and scale or size of digital bandwidth window for the transmission can be preemptively scheduled and determined by a managing network provider on a per transmission basis, according to these controls, because transmission time and virtual transmission path controls, and whereby all video mail traffic, are independent of each video mail sender, said video mail delivery, being controlled and transmitted on a per transmission basis, can be reported with certainty, and guaranteed to each sender or subscriber, and all receivers, being either end receivers or multimedia merging processors, of the video mail, said video mail delivery, being controlled and transmitted on a per transmission basis, enables the notification of all other agent network providers or transmission entities both locally, and at all effective control points along the virtual transmission path of the exact time and period of each anticipated video mail transmission, in order to guarantee an adequate bandwidth window for each said video mail transmission along each time determined virtual transmission path.

4. The method of claim 2, operating on a telecommunication system involving one or several public or private switched telephone, computer, cable, satellite or wireless agent networks or transmission enabling entities, on a per transmission basis, to provide video mail transmissions from each sender-subscriber's premises to each identified receiver premises, said telecommunication system managed by a managing network provider, which may be one of the aforementioned networks said telecommunication system comprising:

one or several managing network provider, or agent network provider offices, or points of presence of the managing network provider, receiving digital or analog video signals from local sender-subscribers as well as orders regarding the delivery of video mail and any requests of notification of successful delivery from sender-subscribers, and one or several offices, local to recipients, routing the video mail to receivers locally, said receiving local offices including a video mail gateway, being potentially the first control point of any virtual transmission path to each and every receiver, said virtual transmission path being controlled specifically for any video mail transmissions by the managing network provider's operators or transmission control system, said operators or transmission control system also providing, on occasion, similar virtual path controls over video mail received from each sender-subscriber at the local office video mail transmission interface to the video mail gateway, such as RF band or acceptance bandwidth;

an office interface for each sender-subscriber or video mail receiver, including an operator, voice, data or voice and data interactive system to obtain necessary information about each sender-subscriber's video information and then to inform each sender-subscriber as to when the transmission will take place, another interface to handle the reception of each sender-subscriber's video mail, in one or more of the following transmission forms, satellite downlink, digital wireless or analog RF wireless or coaxial transmission, digital optical fibre, digital coaxial or digital telephone line transmission, a similar operator or interactive interface and one or more of said video mail interface capabilities also being included at an office local to each identified receiver;

each said sender-subscriber premises including the means of transmitting the video mail to the local office, which may include a video camera, image digitizer or scanner, television, VCR, video network server or video computer system, video telephone, satellite uplink, digital wireless modem or RF analog signal transmitter; transmission interface multiplexer or digital encoder for an optical fibre or coaxial cable link to the nearest local office, or a line provided by a telephone company with sufficient bandwidth to transmit video of an accepted picture information quality for each sender-subscriber, said means of transmission can also include digital compression or modulation capabilities at each sender-subscriber's premises;

each said receiver premises receiving each sender-subscriber's video mail, which is controlled by the managing network's transmission control, including the means of receiving the video mail, which may include a video telephone, television, VCR, video network server or video computer system, satellite downlink, digital wireless modem or RF analog signal transmitter; transmission interface multiplexer or digital encoder for an optical fibre or coaxial cable link to the nearest local office, or a line provided by a telephone company with sufficient bandwidth to receive video of the originally transmitted picture information quality or an accepted picture information quality determined by the bandwidth between a receiver and a local office, said means of receiving the video mail can also include digital decompression or demodulation capabilities at the receiver's premises.

5. The method of claim 2, further comprising a method by which the managing network provider may with liberty through its own telecommunication system or through the telecommunication systems of agent networks, on a per transmission basis, at any control point along any virtual transmission path, convert the video mail transmission from analog to digital formats, compress and decompress the message using digital methods of video and audio compression, or use any digital modulation techniques to squeeze more bandwidth onto a single RF carrier, encrypt the message, convert the video mail transmission at any point from one to any other digital communication protocol, determine the period of usage and frequency of the band for digital wireless or analog RF transmission, determine the period of transponder access on a satellite to enable a satellite uplink for the transmission, or provide these latter two capabilities to each sender-subscriber directly for the local leg of the video mail transmission, from each sender-subscriber to a local office, before the first control point, as well as at any control point along the virtual transmission path thereafter.

6. The method of claim 2, further comprising a method by which a single or network of video mailbox systems, each consisting of a computer or microprocessor, and a computer memory capability to store database information, may be used by the managing network provider to schedule, at any control point along the virtual transmission path, the necessary bandwidth, protocol formats and routing of every video mail transmission on a per transmission basis, said video mailbox database storing said database information per transmission as each senders' and all recipients' video mail transmission telephone or network node addresses, transmission time, duration, input picture information quality or format, requested message encryption, identified receivers' names and addresses for documented receipt, and such control point information per transmission path from each sender to each identified receiver as available switch/router protocol translation processors, compression/decompression and modulation/demodulation processors, agent network bridges, encryption processors, bandwidth scaling processors, analog to digital conversion interfaces, satellite transmission interfaces and wireless transmission interfaces, and any other network control information pertaining to the routing and scheduling of an adequate transmission path, based on an assessment of adequate bandwidth window provided by all necessary control points between each sender and each identified receiver.

* * * * *

UNITED STATES PATENT AND TRADEMARK OFFICE
CERTIFICATE OF CORRECTION

PATENT NO.  : 5,557,320
DATED       : September 17, 1996
INVENTOR(S) : Krebs

It is certified that error appears in the above-identified patent and that said Letters Patent is hereby corrected as shown below:

The title page, showing the illustrative figure, should be deleted to appear as per the attached title page.

Columns 1 through 16, should be deleted and substitute for columns 1 through 18, as per the attached pages.

Signed and Sealed this

Twenty-fourth Day of December, 1996

Attest:

BRUCE LEHMAN

*Attesting Officer*  *Commissioner of Patents and Trademarks*

[54] VIDEO MAIL DELIVERY SYSTEM

[76] Inventor: Mark Krebs, 54 Grandview Ave., Toronto, Ontario, Canada, M4K 1J2

[21] Appl. No.: 380,997

[22] Filed: Jan. 31, 1995

[51] Int. Cl.⁶ .................................................. G06F 13/10
[52] U.S. Cl. ............................ 348/12; 348/13; 455/6.3; 364/514 A; 364/514 C; 364/514 B; 364/514 R; 395/200.01; 395/200.03
[58] Field of Search .................. 395/200.01, 200.03, 395/200.04, 200.11; 348/6, 12, 13, 14–19; 359/400, 402, 407; 455/3.1, 4.1, 5.1, 6.3; 364/514 R, 514 A, 514 C, 514 B, 401; 379/201, 202, 203, 204, 205, 206, 207, 220; 370/100.1, 94, 62

[56] References Cited

U.S. PATENT DOCUMENTS

| | | | |
|---|---|---|---|
| 4,709,418 | 11/1987 | Fox et al. | 455/612 |
| 5,027,400 | 6/1991 | Baji et al. | 380/20 |
| 5,247,347 | 9/1993 | Litteral et al. | 358/85 |
| 5,267,334 | 11/1993 | Normille et al. | 382/56 |
| 5,278,889 | 1/1994 | Papanicolaou et al. | 379/53 |
| 5,303,296 | 4/1994 | Zucker | 379/67 |
| 5,491,797 | 2/1996 | Thompson et al. | 395/200.03 |

FOREIGN PATENT DOCUMENTS

| | | | |
|---|---|---|---|
| 93102843.5 | 2/1993 | European Pat. Off. | H04N 7/137 |

OTHER PUBLICATIONS

Flanag, William A., Frames, Packets and Cells, pp. 103–173.
Morse, Stephen, Super E-Mail, Network Computing, Oct. 15, 1994 pp. 30–34.
Heijnemans, et al., Implementation of TV . . ., ECOC, 1990, pp. 687–692.
Kojima et al., Visual Communication . . ., IEEE THAM 19.7, pp. 362–363.
Chang et al., Call Processing . . ., pp. 225–229.
The Packet, Cisco Systems Users Magazine, Winter 93, pp. 1, 14–17.
Video Dial Tone: Putting the Pieces Together, Telephony Jul. 25, 1994 pp. 6–21.
Digicipher II Multi-Channel Digital Television System Video Compression Chipset . . ., Fast Forward with LSI Logic, Dec. 1990 pp. 1–3.
Video Communications Using 36150 ATMNET, Newbridge 1993 Proposal for AT&T Interspan ATM and Global Frame Relay Services . . ., AT&T, Dec. 13, 1993.

*Primary Examiner*—Victor Kostak
*Assistant Examiner*—Nathan J. Flynn

[57] ABSTRACT

A sender-subscriber based, transmission traffic control system for video mail, which includes the transmission of bulk electronic data primarily in the form of still or motion picture images, with or without audio track. There are variable bandwidth controls on a per transmission basis. A delivery network system provider offers a subscriber service in which the network has absolute control over the actual time of the video mail transmission. The path, bandwidth allocation, protocol format, and other means of transmission—such as wireless, satellite, analog—can be set at the discretion of the network provider. The system can provide transmission data, such as delivery and receipt notification to each sender-subscriber, each recipient, and all other participating transmission agents and networks that are different from the managing network delivery system.

11 Claims, 8 Drawing Sheets

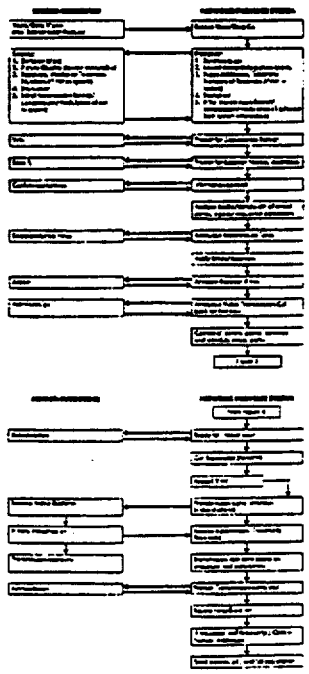

VIDEO MAIL DELIVERY SYSTEM

FIELD OF INVENTION

The invention relates to telephone, wireless, satellite and CATV communication systems and networks. In particular the invention relates to the delivery of video content.

BACKGROUND OF THE INVENTION

The current methods of delivering video data over existing television, telephone and computer networks require either fixed transmission methods or possible lower transmission quality.

The transmission of images and full motion video data over television networks has evolved from (i) broadcast television transmitting fixed schedules of programming, (ii) to multiple channel cable television, available to local CATV subscribers, (iii) to pay-per-view programming, where subscribers place an order with the cable operator for the subscriber's descrambling of a scheduled program to permit subscriber viewing at a designated time.

Due to the emergence of more sophisticated, standardized digital compression techniques like Motion Pictures Experts Group (MPEG), and switched, scalable protocols like Asynchronous Transport Mode (ATM), more video data in a compressed, switchable form can be transmitted along virtual channels through the existing telephone line, cable or satellite transponder communications infrastructure. Video signals typically take up about 140 Mb/s of bandwidth. Initial source encoding and compression can reduce this to 45 Mb/s. MPEG compression techniques can now reduce these signals to 1.5 Mb/s for VCR video to 12 Mb/s for realtime, sports network quality. Most CATV systems deliver 450 MHz or 550 MHz to the household at 6 MHz per television channel, with rebuilds delivering 750 MHz. The upper 5–45 MHz can be used for emerging digital delivery, where a 1.2 Mb/s video signal compression can transform a single 6 MHz channel into supporting 12–14 VCR quality channels. The penetration rate of these reception capabilities, however, will take several years to implement, and until that time, other intermediate, interactive video reception strategies like the following patent examples, have been proposed.

Literal et al. U.S. Pat. No. 5,247,347 describes a PSTN architecture for video-on-demand systems, as well as subscriber control of video programming delivery. Accordingly, subscribers are provided with an interface unit including a local loop node for receiving a multiplexed signal from a subscriber local loop. The Central Office interface to the subscriber can receive video signals from a video information provider, and telephone voice and data from the subscriber, the latter allow the subscriber to digitally interact with a Video Information Provider (VIP) system, to enable it to receive buffered digital video signals from a remote Central Office video database through a Digital Cross-Connect (DCS) provided by the PSTN. This digital interaction provides for the selection of a wide variety of selected compressed video/audio data programs, including feature films, music videos, medical and commercial imaging, video phone, video conferencing and video games. Various combinations of voice and data interaction of the subscriber with the VIP are possible, but in all cases video control data is provided over the subscriber loop, which may be coaxial cable, optical fibre or telephone lines from the subscriber's premises to the video buffer in the VIP system, which controls the receipt of video signals.

The subscriber's local loop for the receipt of the compressed video signal must support a 1.5 MB/s digital transmission, or be comprised of a D1 channel (normally a 24 telephone line bundle) overlaid with the standard telephone service signaling.

An alternative to centralized television or cable video distribution systems are video telephony systems, where multiple system users generate their own video transmissions. These PSTN systems are often bandwidth limited, providing only still frame or limited motion video conferencing capabilities, though recently, digital telephone access lines, such as ISDN, can provide scalable better quality. Digital access facilities to consumer homes, however, are not readily available because they require expensive bandwidth commitments through multiple lines or fibre optic links to the nearest telephone company ISDN switch.

In Papanicolaou et al. U.S. Pat. No. 5,278,889, a video telephony system is proposed using cable-television-telephony and a special method of video telephony dialing to overcome some issues of household video telephone cost. Digital bandwidth access limitations for full motion video to the household are viewed as a significant limitation, and these will not be overcome until all homes are provided with fibre access. Hence, a system involving a coaxial cable network, preferably part of an existing cable television system, is proposed to provide a local access link for the transmission of video telephone signals between each originating and destination location and a respective "head end" located on the cable company premises. Each of the head ends is connected to a Point of Presence (POP) of a telephone common carrier, such as AT&T, so that a connection between pairs of head ends, and thus between a pair of video telephone locations, can be made via a switched network maintained by the carrier.

Hence, the cable subscriber can "borrow" part of the RF cable bandwidth not used for entertainment channels and use it for video telephony. A demodulated audio and video signal from a consumer-type camera or camcorder at the subscriber's home is converted to a compressed digital signal, multiplexed with other digital signals on the trunk line and sent to carrier's local POP as a 384 Kb/s composite signal using an ISDN Primary Rate Interface (PRI) connection. Thus, a video telephone number, which could be the same as the subscriber's standard 10-digit telephone number that uses a video capable extension, provides the subscriber with a video telephony dial-up connection through the network.

In the Papanicolaou et al. system, calls are always initiated and completed by the subscriber, with a Network Control Point (NCP) database containing coaxial cable connection path information along with the ISDN bandwidth subscription of the subscriber to provide an automatic telephone call link to a subscriber with similar carrier/cable head end or straight ISDN connectivity to another local exchange. Transmission rate information in the NCP database is also used for rate revision as a video call is being made, if it is discovered that destination subscriber's equipment can only support a lower rate. Hence, the caller's local POP is instructed by the system to re-initiate the call at the lower rate.

As mentioned before, bandwidth capabilities and the network infrastructure required to support the bandwidth necessary for digital video communication can define the quality of the video image. The 384 Kb/s composite signal rate described in the Papanicolaou et al. system is not television quality and not video quality, which at present, given the best MPEG2 compression capabilities, still requires at least 1.5 Mb/s of bandwidth.

In Baji et al. U.S. Pat. No. 5,027,400, a bidirectional, interactive multimedia system is discussed as a combination of cable and a broadband ATM network, the purpose of which is to deliver television commercials requested by subscribers over a cable television network. The desired program and advertisement are delivered to the subscriber via an ATM exchange, and a subscriber video buffering and mixing system encodes the retrieved video or still image information into the cable television channel feed of the subscriber's choice. The system is essentially an on-demand video/image clip database management system, using cable channels for direct to household transmission.

Existing video-on-demand systems are notionally an approximation of a per transmission based delivery system, but their transmission capabilities are defined by the notion of one sender and multiple subscribers retrieving video information from a central office video database. The network controls do not require the degree of traffic scheduling and bandwidth control per transmission that would be necessary for varying numbers of senders and receivers at varying locations, sending varying durations of video data.

Normally, corporate clients lease permanent transmission bandwidth from a PSTN or private network, which is defined by leased bandwidth access. The scale of this access is defined by total corporate needs and is not expressed on a per transmission basis. It requires either a dedicated broadband, point-to-point channel to each destination, or a broadband access line connection to the nearest PSTN POP that handles Switched Multimegabit Digital Services (SMDS). Needless to say, the leasing charge for such dedicated channels or broadband access is beyond what any individual consumer could afford. However, the maintenance of this access allows corporate clients to transmit bulk data at their discretion.

A consumer-scoped video messaging system today could assume the form of a video telephony system as discussed in the prior art. However, the continual maintenance traffic and bandwidth capabilities related to the requirements of on-demand, bidirectional user control, presupposes constant parameters that imply bandwidth and broadcast restrictions. Bandwidth is a subscription bandwidth, and uniform throughout the network at set subscriber rates. The subscriber cannot invoke bandwidth that is greater for some transmissions and less for others. This would present an unmanageable traffic problem. Broadcast routing, in the form of conferencing call bridging, must be limited to a few participants. This is due to the node architecture and bandwidth uniformity for all transmissions along the transmission paths of the video telephony network.

Discussions of video mail systems in conference literature on computer networks refer to as a feature of the message-based, common channel signaling protocol of multimedia desktop computer workstations. Networked parties can communicate in several ways using network-informing, call messaging type formats, video mail being one of several realtime messaging types. Video mail is also understood as a special video clip message subset of electronic mail or e-mail. It is described as possessing a new protocol structure, like MIT's Multipurpose Internet Mail Extensions (MIME) protocol, which allows computer workstation users to address and transmit video clips as a supplement to the Internet standard Simple Mail Transfer Protocol (SMTP) for e-mail.

Multimedia "mailboxes" are similar to e-mail mailboxes. They allow computer workstation users to transmit and retain video mail messages to each other, by providing a multimedia computer directory structure. They can also be used to send video mail messages from a user to a process or a process to a process, to produce a combined end result, like an animated computer graphic composite on realtime video. However, computer networks are essentially fixed transmission systems, involving fixed topologies, predetermined messaging controls and uniform bandwidth, based on a required upper limit traffic handling capability.

The object of the invention is to solve one or more of the drawbacks in existing systems discussed above, or to provide other improvements to the art.

SUMMARY OF THE INVENTION

This invention relates primarily to the field of telephone and computer networks. In a first aspect the invention provides a method of transmitting bulk data with a component in the form of still or motion picture images. The data is sent from at least one sender to at least one receiver under the control of a managing network provider. The method executes on a per transmission basis the following steps:

a) each sender identifies intended receivers to the managing network provider and the duration or size of an intended transmission of data, b) the managing network provider checks data transmission traffic over a virtual transmission path between each sender and each identified receiver to determine appropriate transmission times, c) the managing network provider provides a scheduled transmission time to each sender, d) the managing network provider sets up each control point along the virtual transmission path to each identified receiver for the scheduled transmission time, and e) each sender transmits the bulk data at the scheduled time through the virtual transmission path to each identified receiver.

In another aspect the invention provides a broadband video mail transmission, defined as a transmission of bulk electronic data with a component in the form of still or motion picture images, with or without audio track, that assumes delivery, characteristics of posted mail. The managing network provider, being a PSTN, cable company or private network, assumes all control over the transmission and network setup, in place of the sender's involvement outside of simply inputting the message, and reports the particulars of the transmission, including the transmission time/receipt time, to all other subsidiary network providers, and, if requested, in the manner of registered or certified mail, to the sender and receivers of the message.

Each video transmission request is scheduled for transmission by a managing network provider, and the video transmission itself can be manipulated during transmission by all involved telephone and/or computer networks, in a way analogous to the post office handling all aspects of letter delivery after a letter is deposited in a mailbox. This imparts a full range of transport capabilities on a per transmission basis to the managing network provider who may combine, for different sections of the transmission path, a variety of agent networks, local and interurban interexchanges, along with fibre optic and coaxial, satellite, analog RF and digital wireless communications infrastructure. The managing network provider can also transport the message through a variety of digital protocol formats, compress and decompress the message at certain points on the transmission path, and interchangeably convert between analog and digital formats, depending on the switch, transmitter and line hardware of the telecommunication path, to realize the most efficient transmission path for the video mail message.

This method of network provider control implies a bandwidth traffic and cost economy to both the network provider and the sender-subscriber, because it eliminates the need for the sender-subscriber to permanently engage a network provider for a dedicated send point to receiver point broadband channel to any or several video mail receivers. Transmission time itself, is determined by the managing network provider. The network provider can therefore schedule a transmission time period that optimizes channel traffic and available bandwidth. Hence, a constant subscriber access parameter never limits network capability. The same message may be sent to several destinations or the same destination using different routes, protocols and bandwidth controls along each sender-receiver transmission path.

This approach also allows the managing network provider to avoid the high cost of storing a whole video message, and to provide notification of guaranteed transmission/delivery and picture quality once the network route has been set and all receivers have been informed of the transmission time. The managing network provider could also use a system of intelligent network congestion controlling video mailboxes, each having some information storage capability and a routing switch or microprocessor, to maintain and deploy such information as the time, duration, destination (either end receivers or multimedia merging processes), bandwidth allocation, protocol format, virtual routing scenario, setup controls, and network requirement information on a number of video mail transmissions.

A video mail delivery system, characterized in this manner, could become a motivating application for the extension of urban and interurban broadband communications infrastructure, because of its potential commercial and consumer market appeal. Also, the current regulation of US Federal Communications Commission states that in order for PSTNs to offer authorized video dialtone services, they must offer common carriage gateways to other video transmission providers who may wish to take advantage of the PSTN's switching and interexchange capability.

The video mail delivery system here described could be a suitable service offering by PSTNs that complies with the current regulatory structure, in which case a PSTN network may pick up video mail transmissions from individual senders, multiplex them into a broadband interexchange channel and allow cable networks at the receiver end to act as agents of local distribution.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 1 is a general diagram showing telecommunication components of a video mail delivery system; and FIG. 2 is an example of two different transmissions through a network for the system of FIG. 1; and FIG. 3 is an example of two simultaneous transmissions through a network with preemptive traffic control for the system of FIG. 1; and FIG. 4 and FIG. 5 are flow charts indicating sender/managing network provider interaction steps allowing for preemptive transmission traffic control in the system of FIG. 1; and FIG. 6 is an illustration of data communication connections to a video mailbox system of control node operation and other video mailboxes; and FIG. 7 is an illustration of a sample transmission path database maintained in the video mailbox system of FIG. 6; and FIG. 8 is a detailed illustration of a portion of the database of FIG. 7 showing virtual paths controls per receiver path.

DETAILED DESCRIPTION OF THE PREFERRED EMBODIMENT

FIG. 1 illustrates example components of a telecommunication system 1 that could be used to transmit a video mail message from sender to receiver. The video mail signal initiated at the premises of the sender-subscriber 2 might be done by such equipment as a video camera 3, image digitizer or scanner 4, VCR 5, video network server 6 or video computer system 7, video telephone 8, using a satellite uplink 9, digital or analog wireless modem 10 or RF signal transmitter 11, optical fibre interface 12, bidirectionally amplified coaxial cable interface 13, or an interface to a D1 or T1 line 14 provided by a telephone company with sufficient bandwidth to transmit video of a sender-accepted picture information quality. The sender-subscriber's and receiver's equipment might also include an integrated multiplexer/demultiplexer, modulator/demodulator, digital encoder/decoder and/or compression encoder/decoder system 15.

Each network provider office, one 16 local to the sender, another 17 local to the receiver, has an analog or digital interface for either satellite 18, wireless modem 19 or RF receiver 20, coaxial 21, optical fibre 22, or D1 telephone line transmission 23. The local sender or receiver POP video signal transmission interface 24 is directly connected to a video mail gateway 25 linking into the network provider's offering of transmission paths.

The video gateway 25 is directly controlled by an operator of the managing network provider local office POP 16. The gate 25 could simply be a digital switch or router with an analog video signal interface, like a Cisco AGS+ Router 26a with an analog video V.35 interface and ATM or FDDI output, a Scientific-Atlanta MPEG2 Router using an LSI Logic L64700 CCITT Encoder 27a to take NTSC analog signal input to discrete, highly compressed MPEG2 packet output. A combination of ATM virtual channeling and SONET aggregation could be done by using an AT&T AAN-2000 High Speed Service Multiplexer 28a, or an 8×8 switch fabric, Newbridge 36150 MainStreet ATMnet switch 29a, to route ATM formatted video transmissions at Constant Bit Rate (CBR) to an AT&T interSpan's GCNS-2000 ATM System's OC3c SONET 30a channel between two major urban centers. The gateway 25 could also be represented by a General Instrument DigiCipher II 31a system to input either digital video or analog NTSC signals, multiplex and compress them as MPEG2 bitstreams, uplink them to a satellite transponder for a multiple receiver broadcast, which is then downlinked to a DigiCipher Integrated Receiver/Decoder (IRD) 31b in a cable head end to convert back to NSTC. Finally, if the receiver were local, the gateway 25 could be a CellularVision 28-Ghz wireless transmitter 32.

Local POP video gateway switches can provide encryption, as in the case of the DigiCipher system 31a, or encryption may have to be done by routing the transmission to an interpath POP 33 PSTN Central Office that has suitable device technology. Varying picture quality, or varying bandwidth transmission, can be provided to senders like hospitals or computer graphic production studios that have special scalable bandwidth facilities themselves, like High Speed Digital Subscriber Lines (HSDLs) 15, to the network POP, or a digital video server 6 that allows transmissions at different rates.

Typical interexchange path controls would be provided at an interpath POP 33 by the PSTN. These include dedicated or switched channels using protocols such as ATM, optical fibre FDDL SONET and Internet IP. Hence, before the i interchange transmission occurs, a control point broadband switch or router with such protocol interfaces would translate the message into one of these formats. As PSTN ATM and SONET services become more disseminated, these would be the desirable formats because of the windowing advantages bandwidth "throttling", or protocol controlled scalability and virtual channeling, and the fixed length cell based digital packets necessary for the timing of continuous video messaging. Alternatively, interexchange paths may simply favour high compression MPEG2 signal routing because of the high protocol overheads associated with ATM format. This approach is more convenient to implement in satellite communication because the entire interexchange control or even direct communication to the receivers, if they are equipped with MPEG2 decoders, can be handled by a single digital satellite uplink.

At the network provider's receiver end POP 17, video gateway counterparts 26b, 27b, 28b, 29b, 30b, 31b to the entry video gateway or an interpath POP 33, receive the incoming transmission and convert it to a suitable delivery format. The local video gateway may have to convert the signal to analog and multiplex the signal at the cable head end of a local cable network for broadcast 34, or scale signal bandwidth using multiplexers to provide different transmission windows on a frequency, multiplex basis to best suit equipment at the receiver's premises 35. The receiver then receives the transmission on a cable information channel 36, VCR 37, computer video system 38, video telephone system 39 or wireless modem. RF receiver or satellite downlink for a receiver in transit 40.

The network architecture for the example telecommunications system 1 can either be provided through a private network control system, which acts as the network manager of existing PSTN, satellite or cable network facilities, or it can be provided directly by a PSTN to the sender, where the PSTN acts as a managing network of other agent networks, if necessary, in order to provide a physical telecommunication link between a sender and a receiver.

The physical components of such a telecommunications system, including all controlling systems, which can convert a video signal from analog to digital, compress or modulate that signal using a variety of methods, encrypt the signal, uplink the signal to satellite, transmit the signal on a wireless local link, assess the traffic congestion along a given transmission path, and thereby allocate bandwidth through scheduling, all exist in today's PSTN telecommunication systems. However, these capabilities are not grouped together as controls of a common network, and a service is not offered to consumer or corporate clients, by either PSTNs or private networks as a per transmission based, video transmission delivery service.

By controlling all transmission time and routing options for each sender's transmission in the example telecommunications system 1, a managing network provider can group transmission control components represented in FIG. 1 together for each transmission path as per-transmission-flexible control parameters. Each transmission path containing these variable control parameters, defined by a managing network provider on a per transmission basis for each sender/receiver path, will be termed a virtual transmission path for the purposes of this description.

The managing network provider's virtual transmission path controls can include such capabilities as variable bandwidth allocation, variable time and band of analog RF or digital wireless transmission, strategic multiplexing, variable signal compression and modulation, and variable strategic routing and protocol format interchangeability. A selective use of satellite or wireless transmission for certain sender-receiver transmission paths can also have a strategic significance, depending on either the sender or the receiver's point of presence. If one of the parties is in transit, at least one leg of the virtual transmission path, if not the entire path, would have to be wireless. Depending on sender or receiver's transmission or reception equipment, this leg can be expressed as an analog transmission on a dedicated RF band, licensed by the managing network provider. Multiple transmissions can be scheduled sequentially on a single RF band to avoid interference.

Since transmission times and virtual transmission paths are sender-independent for all transmissions, the managing network provider has an opportunity to preempt any traffic congestion scenarios caused by multiple simultaneous or time-overlapping transmissions of continuous video mail messages along common virtual transmission paths.

FIG. 2 shows the bandwidth and routing requirements of two different transmissions having some common traffic control points. FIG. 3 illustrates a simultaneous transmission of the two transmissions of FIG. 2, using a per transmission based preemptive traffic control due to the managing network's assessment of an optimal transmission time and transmission paths.

Message 1 from sender S1 to receivers R11 and R12, is 3 minutes in duration, requiring a minimum picture information quality of 1.5 MB/sec., compressed rate. Message 2 from sender S2 to receivers, R21 and R22, is 5 minutes in duration, requiring a minimum picture information quality of 1.0 MB/sec., compressed rate. The minimum bandwidth window (W) for Message 1 is therefore $1.5 \times 60 \times 3 = 270$ MB, and 300 MB for Message 2.

In FIGS. 2 and 3, window bandwidth, W, at example control points, c11, c12, c21 . . . , are shown at two transmission times, 7:05PM and 7:10PM. Hence, at 7:05PM and 7:10PM, Wc11 and Wc21=350 MB; at 7:05PM Wc22=400 MB and Wc33 is not available, at 7:10PM Wc33=800 MB, Wc11 and Wc21=350 MB. Wc22=600 MB, Wc12=280 MB.

Any congestion problem arising from a simultaneous transmission of the two transmissions in FIG. 2 is overcome by scheduling both transmissions at 7:10 PM, when it is possible to use an alternative traffic routing for two of the transmission paths through another control point, c33. An additional benefit in network bandwidth is realized by economically routing the two other transmission paths through Wc22=600 MB at 7:10PM, thus freeing up bandwidth windows at Wc12 and Wc21.

This traffic efficiency, through the preemptive 7:10PM rescheduling and rerouting of FIG. 4, is not possible if network traffic is instigated at the senders' discretion. When senders determine the traffic picture, network controls based on network averaging or first-in-first-out (FIFO) buffering strategies accommodate new traffic flow. Hence, the network system would interrupt a second sender transmission on a common transmission path with a busy signal until the first transmission were through, but by the time the second sender attempted a transmission, there might be another interruption by a third sender's transmission along the same path.

Such network controls can deal with the problem of traffic congestion, but since they must respond, on-demand, to sender transmissions, they sometimes enforce traffic control at the expense of bandwidth efficiency. Such controls certainly do not provide predictive, efficient network usage on a per transmission basis, since transmission time, route and the amount of data of individual transmissions are not known to the network system until a sender tries to transmit. The routing and bandwidth inefficiencies of on-demand network traffic management are especially pronounced for the bulk data transmission of digital video, which require large amounts of bandwidth, fixed length packets or cells and constant, committed channel bit rate for the duration of each transmission.

The FIG. 4 drawing illustrates the steps of sender/managing network provider interaction that allows for preemptive traffic control. This interaction is initiated by the sender-subscriber through a telephone, video telephone or computer e-mail in a call to the video mail delivery. system's business office or POP 16. The number called could have a dedicated telephone prefix, like an 800 number, in which case, the office may not be local and may be some central office of the managing network provider. At the business office, the sender-subscriber either speaks to an operator or is connected to a computerized voice/data interactive system (PBX), or in the case of e-mail, a data interactive system, to allow both voice and data replies to the prompts of the interactive system. The operator or interactive system has direct access to the managing network's traffic management database, which stores information on previously scheduled traffic, qualified by network information from the managing network provider's network control system. The network provider's control system consists of automatic and network-operator assisted bandwidth and message format controls along specified transmission paths. Together, the network control and traffic information determine optimal periods of future bandwidth availability, for new virtual transmission path scheduling. These periods can be depicted as transmission time options by the operator to the sender-subscriber.

Through the steps of the interactive process described by FIG. 4, the sender-subscriber specifies the receivers and transmission duration or size, input rate, format and/or compression if this is not already included in the client database of the network provider, desired encryption, and lowest acceptable picture quality, or required picture quality/format if the sender's transmission equipment permits high resolution or differentiated data transmission rates or formats. The office operator or system may then prompt for any reporting requirements to the sender-subscriber on the actual receipt of the video mail by the receiver or receivers. If requested, the office system can provide a documented notice of video mail receipt for legal or other business purposes, and would prompt the sender for such information as the telephone number and address, as well as names, to obtain this confirmation by mail or e-mail from the receivers.

Given these sender-subscriber inputs and the existing knowledge of previously scheduled traffic, the office operator then proposes a number of alternative times for the actual transmission, given the understanding that the transmission time is also contingent on the availability of all receivers.

Receiver availability for the specified times is then verified by a network operator. This verification can be done during this initial interaction and may assume the form of a telephone call. Operator receiver verification, may not be possible or necessary, as in the case of a video mail transmission distributed through a satellite broadcast. If receiver acknowledgement is not possible during this interaction, the sender-subscriber would have to be notified at a later time by the system, as to the most suitable transmission time for receivers. If receiver availability cannot be confirmed, the office may request the sender-subscriber to stipulate another transmission time option to handle the transmission request, and the receiver verification steps would have to be repeated. Once all receivers and the sender agree on a common transmission time, this information, along with all other sender inputs, input to the managing network provider's traffic management database by the office operator or interactive system.

Prior to the actual sender-scheduled transmission linkup, all virtual transmission path controls are properly set by the managing network provider to ensure the transmission requirements. These determinations and virtual transmission path setups for all controls are pre-scheduled by the managing network provider operator. The managing network provider, being in control of the transmission time and the network traffic, is capable of requesting and scheduling bandwidth and protocol translation processing at virtual path control points from all involved network or transmission agents per video mail transmission, per receiver path for the period of each transmission.

Hence, the managing network provider can combine, at different points of the transmission path, a variety of agent networks—for example, local and interurban interexchanges, fibre optic and coaxial, satellite, analog RF and digital wireless transmission infrastructure; to translate the message into a variety of digital protocol formats (eg. ATM, FDDI, IP, SMDS, ISDN, SONET, Fast Packet); to encrypt, compress and decompress, or modulate and demodulate the message, (eg. using MPEG compression standards, Motion Compensation Prediction or Motion Compensation Interpolation, or other proprietary techniques, or digital modulation techniques, such as Quadrature Amplitude Modulation or Vestigial Side Band); and to convert from analog to digital and digital to analog formats, depending on the switch, transmitter and line hardware along the transmission path, in order to set up a viable virtual path for the video mail transmission.

Referring now to FIG. 5, the sender-subscriber is contacted by the network system office to initiate the actual video mail transmission. Before this contact is made, the system office would have already set or scheduled the setup of all parameters along the virtual transmission paths necessary for the video mail transmission. It is also assumed that all recipient parties would also have been notified of the expected transmission time. Subsequently, the sender receives video dialtone or a connect video signal, and initiates the transmission. Once the transmission is completed, a voice or e-mail message from the business office might inform the sender of a recorded time of each receiver's reception, and documented confirmation of reception, if requested, can be mailed to the sender along with a monthly bill.

FIG. 4 and FIG. 5 and the foregoing descriptions of these two illustrations, represent the sender/system interaction of the method without showing various checks which could be used to confirm or correct each step. For example, sender-subscriber's telephone number could be cross-referenced on the database of the office system, as well as the number, address and video mail reception capabilities of the intended recipients. If the recipients weren't subscribers themselves, their technical reception capabilities would also have to be obtained through a network operator contact before being input into the traffic management database to determine the viability of network connectivity.

An operator independent determination of the virtual transmission path can be done by a video mailbox system shown in FIG. 6. Video mailbox systems can automate virtual transmission path creation and provide video mail traffic scheduling control. In order to do this, each video mailbox system involves a computer system 41, connected to a narrowband network 42 for data communication updates to regional or local transmission control point operator computers 43 or actual device controllers along a video mail transmission path, and additional narrowband data communication updates to the traffic databases of other video mailbox systems 44 relevant to the administration of newly scheduled virtual transmission paths. A local video mailbox could also be narrowband networked to the voice/data PBX computer, or e-mail sender interactive office system (office operator's computer) 45, which functions according to the steps described in FIGS. 4 and 5. Sender specified data inputs transmitted directly to the local video mailbox, could then be directly input to a video mailbox database to determine transmission path scheduling and setups.

As shown by the example in FIG. 7, each video mailbox traffic database references network node addresses such as videophone numbers, telephone numbers or transmission frequencies for each sender-subscriber. Similar addresses for non-subscriber recipients would be input to the video mailbox for each video mail message, along with other per transmission inputs, such as transmission duration, input picture quality/format, requested encryption and the names and addresses of receivers for a documented reporting of video mail receipt.

The video mailbox then references database information on already scheduled traffic over the next, for example 48 hours, to determine a transmission period for the duration and picture information quality of the transmission. The video mailbox system, then calculates the transmission times based on data it already has about potential receiver path control points and bandwidth usage in its traffic database.

Additional example traffic database information, referred to as virtual path controls per receiver path 46 in FIG. 7 and shown as FIG. 8, includes information on all available routing and bandwidth control points for a given receiver transmission path. This information allows the video mailbox system t to define the routing options of the virtual path, with the available bandwidth window defined at each control point at system selected times 47. The video mailbox database also includes each control point network address 48, and can also include other control point information available for transmission control, such as switch/router protocol translators, compression/decompression and modulation/demodulation processors, agent network bridges, encryption processors, bandwidth scaling processors, analog to digital conversion processors, available satellite uplink/downlink bands and available wireless transmitter/receiver bands.

The video mailbox determines the virtual transmission path from its database of switch, router or transmitter data, and data on compression capabilities at control points along each receiver path. Efficiencies are obtained by reducing the number of agent networks or actual transmission connections, such as switches, routers, uplinks/downlinks and wireless transmitters, along a potential virtual transmission path. All efficiency criteria would be contingent on the physical switch, router and transmitter infrastructure along a required transmission path. Controls offering compression or modulation capabilities and conversion to the most ubiquitous rotating protocol would then be key priorities.

Once all optimizations are met, the virtual transmission path is defined in terms of optional times. Choosing the actual transmission time option would then follow through a common agreement by the sender, receivers and all necessary transmission path control point operators.

The foregoing is intended, along with the drawings, to illustrate the preferred embodiment of the invention. Those skilled in the art will be able to devise numerous arrangements which, although not explicitly shown or described herein, embody the principles of the invention and are within their spirit and scope as defined by the following claims.

What is claimed is:

1. A method of transmitting bulk data with a component in the form of still or motion picture images from at least one sender to at least one receiver under the control of a managing network provider, the method comprising executing on a per transmission basis the following steps:

a) each sender identifying intended receivers to the managing network provider and the duration or size of an intended transmission of data, b) the managing network provider checks data transmission traffic over a virtual transmission path between each sender and each identified receiver to determine appropriate transmission times, c) the managing network provider provides a scheduled transmission time to each sender, d) the managing network provider sets up each control point along the virtual transmission path to each identified receiver for the scheduled transmission time, and e) each sender transmits the bulk data at the scheduled time through the virtual transmission path to each identified receiver.

2. A method of video mail transmission, defined as a transmission of bulk electronic data with a component in the form of still or motion picture images, with or without audio track, the method comprising the following steps being executed on a per transmission basis between each sender and a managing network provider, being a PSTN, cable company or private network that assumes all control over the transmission and network setup, with each sender's involvement reduced to simply inputting the video mail transmission at a network designated time:

(a) each sender initiating the method by first calling the office of the managing network provider, and specifying the telephone numbers or network node address of each receiver of the intended video mail transmission and the duration or size of the intended transmission;

(b) each sender also specifying minimum picture quality and desired encryption of the intended transmission, and whether the receipt of the transmission should be registered or reported by each recipient;

(c) the managing network provider then checking existing and scheduled video mail transmission traffic between each sender and each identified recipient, to determine appropriate transmission times, taking into account all possible bandwidth and transmission controls known to the network that can provide a transmission capability to fully transmit the video mail transmission, and would also optimize available network bandwidth and transmission capabilities for other potential video mail traffic;

(d) the managing network provider announcing one or several optional transmission times to each sender;

(e) the managing network informing all potential agent networks, and all transmission control points along the transmission paths between each sender and each identified recipient of the agreed to time and data communication requirements of the intended video mail transmission, and hence, setting all control points, either through its own operators or the operators of agent networks, and informing all such agents of the pending transmission immediately before calling each sender to instruct each sender to initiate the transmission;

(f) the managing network calling each sender, each sender initiating the video mail transmission at a transmission time designated by the managing network, and then transmitting the video mail to each receiver designated by each sender;

(g) the managing network, if requested to do so by each sender, obtaining a documented confirmation of receipt of the entire video mail transmission from each receiver designated by each sender.

3. The method of claim 2, further comprising a method of transmission-time-flexible video mail delivery along a virtual transmission path, herein defined as a set of transmission controls along a transmission path from each sender to each identified receiver of the video signal transmission, wherein the transmission time, transmission speed, route, encryption, compression, modulation, protocol format, transmission devices and route, RF frequency band, and scale or size of digital bandwidth window for the transmission can be preemptively scheduled and determined by a managing network provider on a per transmission basis, according to these controls, because transmission time and virtual transmission path controls, and whereby all video mail traffic, are independent of each video mail sender, said video mail delivery, being controlled and transmitted on a per transmission basis, can be reported with certainty, and guaranteed to each sender or subscriber, and all receivers, being either end receivers or multimedia merging processors, of the video mail, said video mail delivery, being controlled and transmitted on a per transmission basis, enables the notification of all other agent network providers or transmission entities both locally, and at all effective control points along the virtual transmission path of the exact time and period of each anticipated video mail transmission, in order to guarantee an adequate bandwidth window for each said video mail transmission along each time determined virtual transmission path.

4. The method of claim 1 or 2, operating on al telecommunication system involving one or several public or private switched telephone, computer, cable, satellite or wireless agent networks or transmission enabling entities, on a per transmission basis, to provide video mail transmissions from each sender-subscriber's premises to each identified receiver premises, said telecommunication system managed by a managing network provider, which may be one of the aforementioned networks said telecommunication system comprising:

one or several managing network provider, or agent network provider offices, or points of presence of the managing network provider, receiving digital or analog video signals from local sender-subscribers as well as orders regarding the delivery of video mail and any requests of notification of successful delivery from sender-subscribers, and one or several offices, local to recipients, routing the video mail to receivers locally, said receiving local offices including a video mail gateway, being potentially the first control point of any virtual transmission path to each and every receiver, said virtual transmission path being controlled specifically for any video mail transmissions by the managing network provider's operators or transmission control system, said operators or transmission control system also providing, on occasion, similar virtual path controls over video mail received from each sender-subscriber at the local office video mail transmission interface to the video mail gateway, such as RF band or acceptance bandwidth;

an office interface for each sender-subscriber or video mail receiver, including an operator, voice, data or voice and data interactive system to obtain necessary information about each sender-subscriber's video information and then to inform each sender-subscriber as to when the transmission will take place, another interface to handle the reception of each sender-subscriber's video mail, in one or more of the following transmission forms, satellite downlink, digital wireless or analog RF wireless or coaxial transmission, digital optical fibre, digital coaxial or digital telephone line transmission, a similar operator or interactive interface and one or more of said video mail interface capabilities also being included at an office local to each identified receiver;

each said sender-subscriber premises including the means of transmitting the video mail to the local office, which may include a video camera, image digitizer or scanner, television, VCR, video network server or video computer system, video telephone, satellite uplink, digital wireless modem or RF analog signal transmitter; transmission interface multiplexer or digital encoder for an optical fibre or coaxial cable link to the nearest local office, or a line provided by a telephone company with sufficient bandwidth to transmit video of an accepted picture information quality for each sender-subscriber, said means of transmission can also include digital compression or modulation capabilities at each sender-subscriber's premises;

each said receiver premises receiving each sender-subscriber's video mail, which is controlled by the managing network's transmission control, including the means of receiving the video mail, which may include a video telephone, television, VCR, video network server or video computer system, satellite downlink, digital wireless modem or RF analog signal transmitter; transmission interface multiplexer or digital encoder for an optical fibre or coaxial cable link to the nearest local office, or a line provided by a telephone company with sufficient bandwidth to receive video of the originally transmitted picture information quality or an accepted picture information quality determined by the bandwidth between a receiver and a local office, said means of receiving the video mail can also include digital decompression or demodulation capabilities at the receiver's premises.

5. The method of claim 2, further comprising a method by which the managing network provider may with liberty through its own telecommunication system or through the telecommunication systems of agent networks, on a per transmission basis, at any control point along any virtual transmission path, convert the video mail transmission from analog to digital formats, compress and decompress the message using digital methods of video and audio compression, or use any digital modulation techniques to squeeze more bandwidth onto a single RF carrier, encrypt the message, convert the video mail transmission at any point from one to any other digital communication protocol, determine the period of usage and frequency of the band for digital wireless or analog RF transmission, determine the period of transponder access on a satellite to enable a satellite uplink for the transmission, or provide these latter two capabilities to each sender-subscriber directly for the local leg of the video mail transmission, from each sender-subscriber to a local office, before the first control point, as well as at any control point along the virtual transmission path thereafter.

6. The method of claim 2, further comprising a method by which a single or network of video mailbox systems, each consisting of a computer or microprocessor, and a computer memory capability to store database information, may be used by the managing network provider to schedule, at any control point along the virtual transmission path, the necessary bandwidth, protocol formats and routing of every video mail transmission on a per transmission basis, said video mailbox database storing said database information per transmission as each senders' and all recipients' video mail transmission telephone or network node addresses, transmission time, duration, input picture information quality or format, requested message encryption, identified receivers' names and addresses for documented receipt, and such control point information per transmission path from each sender to each identified receiver as available switch/router protocol translation processors, compression/decompression and modulation/demodulation processors, agent network bridges, encryption processors, bandwidth scaling processors, analog to digital conversion interfaces, satellite transmission interfaces and wireless transmission interfaces, and any other network control information pertaining to the routing and scheduling of an adequate transmission path, based on an assessment of adequate bandwidth window provided by all necessary control points between each sender and each identified receiver.

7. The method of claims 1 or 2, wherein the video transmission is made without any requirement of storage of the video transmission by a sender or a network provider.

8. The method of claims 1 or 2, wherein the video transmission from a sender to a receiver occurs immediately upon sender request with the permission of a network provider and within the capabilities of the transmission system provided by a network provider.

9. The method of claims 1 or 2, further comprising a method of video mail delivery along a virtual transmission path, herein defined as a set of transmission controls along a transmission path from each sender to each identified receiver of the video mail transmission, wherein transmission time and period and all or a subset of the following:

1) transmission speed
2) route
3) encryption
4) compression
5) signal modulation
6) multiplexing such as duplexing or multiple message transmission over one channel
7) protocol format
8) use of transmission devices and routers
9) RF frequency band
10) scale or size of virtual channel for the transmission can be preemptively scheduled and determined by a managing network provider on a per transmission basis according to those controls, said video mail delivery can be guaranteed to each sender or subscriber, and all receivers, being either end receivers or multimedia merging processors, of the video mail, said video mail delivery enables the notification of all other agent network providers or transmission entities both locally, and at all control points along the virtual transmission path of the exact time and period of each anticipated video mail transmission, in order to guarantee an adequate bandwidth window for each said video mail transmission along each predetermined virtual transmission path.

10. The method of claim 1 or 2, further comprising a method by which the managing network provider may through its own telecommunication system or through the telecommunication systems of agent networks, on a per transmission basis, at any control point along any virtual transmission path choose all or any subset of the following options:

1) convert the video mail transmission from analog to digital formats
2) compress and decompress the message using digital methods of video and audio compression
3) use any digital modulation techniques to squeeze more bandwidth onto a single RF carrier
4) encrypt the message
5) convert the video mail transmission at any point from one to any other digital communication protocol
6) determine the period of usage and frequency of the band for digital wireless or analog RF transmission
7) multiplex such as duplexing or transmitting multiple messages over one channel
8) determine the period of transponder access on a satellite to enable a satellite uplink for the transmission at any control point along a virtual transmission path
9) determine the period of usage and frequency of the band for satellite, digital wireless or analog RF transmission to each receiver for the local leg of the video mail transmission, or from each sender-subscriber to a local office or first control point.

11. The method of claim 1 or 2, further comprising a method by which a single or network of video mailbox systems, each system including of a computer or microprocessor, and a video mailbox database capability to store database information, may be used by the managing network provider to schedule, at any control point along the virtual transmission path, the necessary bandwidth, protocol formats and routing of every video mail transmission on a per transmission basis, said video mailbox database storing said database information per transmission including data specifying all or a subset of the following: telephone or network node addresses; transmission times; transmission durations; input picture information quality; transmission format;

requested message encryption; identified receivers' names and addresses for documented receipt; control point information per transmission path from each sender to each identified receiver as available, said control point information per transmission path, including data specifying all or any subset of the following:

1) switch/router protocol translation processors
2) compression/decompression processors
3) modulation/demodulation processors
4) agent network bridges
5) encryption processors
6) bandwidth scaling processors
7) analog to digital conversion interfaces
8) satellite transmission interfaces
9) wireless transmission interfaces
10) network bandwidth optimizations based on scalable bandwidth controls.

* * * * *